US008346380B2

(12) United States Patent
Lee et al.

(10) Patent No.: US 8,346,380 B2

(45) Date of Patent: Jan. 1, 2013

(54) METHOD AND AN APPARATUS FOR PROCESSING A SIGNAL

(75) Inventors: Hyun Kook Lee, Seoul (KR); Sung Yong Yoon, Seoul (KR); Dong Soo Kim, Seoul (KR); Jae Hyun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 553 days.

(21) Appl. No.: 12/567,580

(22) Filed: Sep. 25, 2009

(65) Prior Publication Data

US 2010/0079185 A1 Apr. 1, 2010

Related U.S. Application Data

(60) Provisional application No. 61/100,262, filed on Sep. 25, 2008.

(30) Foreign Application Priority Data

Sep. 24, 2009 (KR) ........................ 10-2009-0090516

(51) Int. Cl.
*G06F 17/00* (2006.01)

(52) U.S. Cl. ............................ 700/94; 381/23; 381/310

(58) Field of Classification Search .................. 381/310, 381/119, 17–23; 327/100, 165, 166, 334, 327/355, 233; 704/500, E17.005; 700/94
See application file for complete search history.

(56) References Cited

U.S. PATENT DOCUMENTS 7,447,629 B2 11/2008 Breebaart
7,797,163 B2 9/2010 Pang et al.
7,916,873 B2 3/2011 Villemoes et al.
7,933,415 B2 4/2011 Breebaart
7,961,890 B2 6/2011 Hölzer et al.
2005/0053242 A1 3/2005 Henn et al.

(Continued)

FOREIGN PATENT DOCUMENTS

CN 1954362 A 4/2007

(Continued)

OTHER PUBLICATIONS

Breebaart et al., “Parametric Coding of Stereo Audio”, EURASIP Journal on Applied Signal Processing, vol. 9, pp. 1305-1322, 2005.

(Continued)

*Primary Examiner* — Xu Mei
*Assistant Examiner* — Friedrich W Fahnert
(74) *Attorney, Agent, or Firm* — Birch, Stewart, Kolasch & Birch, LLP

(57) ABSTRACT

A method of processing a signal is disclosed. The present invention includes receiving (a) downmix signal being generated from plural-channel signal and (b) spatial information indicating attribute of the plural-channel signal in order to upmix the downmix signal and including phase shift flag indicating whether phase of a frame of at least one channel of the plural-channel signal is shifted; obtaining inter-channel phase difference (IPD) coding flag indicating whether IPD value is used to the spatial information from a header of the spatial information; obtaining IPD mode flag indicating whether the IPD value is used to frame of the spatial information from the frame based on the IPD coding flag; obtaining the IPD value of parameter band in the frame, based on the IPD mode flag; upmixing plural-channel signal by applying the IPD value to the downmix signal; and shifting the phase of the frame of the at least one channel of the plural-channel signal based on the phase shift flag.

12 Claims, 19 Drawing Sheets

U.S. PATENT DOCUMENTS

| | | | |
|---|---|---|---|
| 2005/0226426 | A1 | 10/2005 | Oomen et al. |
| 2006/0004583 | A1 | 1/2006 | Herre et al. |
| 2006/0153408 | A1 | 7/2006 | Faller et al. |
| 2007/0194952 | A1 | 8/2007 | Breebaart et al. |
| 2007/0219808 | A1 | 9/2007 | Herre et al. |
| 2007/0223709 | A1 | 9/2007 | Kim et al. |
| 2007/0244706 | A1 | 10/2007 | Tsushima |
| 2008/0002842 | A1 | 1/2008 | Neusinger et al. |
| 2008/0031463 | A1 | 2/2008 | Davis |
| 2008/0199014 | A1 | 8/2008 | Kurniawati et al. |
| 2008/0243520 | A1 | 10/2008 | Breebaart |
| 2008/0304670 | A1 | 12/2008 | Breebaart |
| 2009/0210236 | A1 | 8/2009 | Moon et al. |
| 2009/0222272 | A1 | 9/2009 | Seefeldt et al. |
| 2011/0173005 | A1 | 7/2011 | Hilpert et al. |
| 2011/0235810 | A1 | 9/2011 | Neusinger et al. |

FOREIGN PATENT DOCUMENTS

| | | | |
|---|---|---|---|
| CN | 101263742 | A | 9/2008 |
| EP | 1 736 774 | B1 | 5/2008 |
| JP | 2005-523479 | A | 8/2005 |
| JP | 2007-526522 | A | 9/2007 |
| JP | 2007-531913 | A | 11/2007 |
| JP | 2008-527431 | A | 7/2008 |
| JP | 2010-521002 | A | 6/2010 |
| JP | 2011-527456 | A | 10/2011 |
| KR | 10-2008-0051042 | A | 6/2006 |
| KR | 10-0649299 | B1 | 11/2006 |
| WO | WO 2005/086139 | A1 | 9/2005 |
| WO | WO 2006/003813 | A1 | 1/2006 |
| WO | WO 2008/039038 | A1 | 4/2008 |

OTHER PUBLICATIONS

Herre et al., “The Reference Model Architecture for MPEG Spatial Audio Coding”, Presented at the 118th Audio Engineering Society Convention, Barcelona, Spain, May 28, 2006, Convention Paper 6447.

“Text of 14496-3 2001/:FDAM 2, Parametric Coding”, Joint Video Team (JVT) of ISO/IEC MPEG & ITU-T VCEG(ISO/IEC JTC1/SC29/WG11 and ITU-T SG16 Q6) XX XX, No. N6130, Feb. 23, 2004, pp. 1-122, XP030013089.

Gert Weinrich, “Improved Externalization and Frontal Perception of Headphone Signals”, AES, Mar. 24, 1992, pp. 1-46, XP040369732.

Purnhagen, “Low Complexity Parametric Stereo Coding in MPEG-4”, Proc. of Intl., Conf. on Digital Audioeffects, XX, XX Oct. 5, 2004, pp. 163-168, XP002364489.

Samsudin et al., “A Stereo to Mono Downmixing Scheme of MPEG-4 Parametric Stereo Encoder”, Acoustics, Spech and Signal Processing, IEEE Intl. Conf., Jan. 1, 2006, pp. V529-V532 XP031101562.

Werner Oomen et al., “MPEG4-Ext2: CE on Low Complexity Parametric Stereo”, Joint Video Team (JVT) of ISO/IEC MPEP & ITU-T VCEG(ISO/IEC, JTC1/SC29/WG11 and ITU-T SG16 Q6),XX, XX, No. M10366, Dec. 2, 2003, pp. 1-38, XP030039221.

(a)

(b)

METHOD AND AN APPARATUS FOR PROCESSING A SIGNAL

This application claims the benefit of U.S. provisional application 61/100,262, filed on Sep. 25, 2008, and the Korean Patent Application No. 10-2009-00090516, filed on Sep. 24, 2009, which are hereby incorporated by reference as if fully set forth herein.

TECHNICAL FIELD

The present invention relates to an apparatus for processing a signal and method thereof. Although the present invention is suitable for a wide scope of applications, it is particularly suitable for enhancing a sound quality of a signal and reconstructing an inputted signal more perfectly in a manner of using a signal generated from shifting a phase of the inputted signal and using inter-channel phase difference value of the phase-shifted signal.

BACKGROUND ART

Generally, in order to generate a stereo signal from a mono signal, a signal is coded using a decorrelator.

And, a signal processor is able to code a signal using inter-channel level difference value and inter-channel correlation value.

DISCLOSURE OF THE INVENTION

Technical Problem

However, in case that an audio signal is generated using a decorrelator, the decorrelator is not able to precisely reproduce a phase or delay difference existing between channel signals.

In case of coding a signal using inter-channel level difference value and inter-channel correlation value, it is unable to restore and reflect an inter-channel phase difference of an input signal. Therefore, it is difficult to perform precise sound image localization. And, it is unable to restore reverberation of an input signal.

Technical Solution

Accordingly, the present invention is directed to an apparatus for processing a signal and method thereof that substantially obviate one or more of the problems due to limitations and disadvantages of the related art.

An object of the present invention is to provide an apparatus for processing a signal and method thereof, by which a sound quality is enhanced and a signal close to an original sound can be provided in a manner of reconstructing and shifting a phase of a decoded audio or speech signal.

Advantageous Effects

Accordingly, the present invention provides the following effects and/or advantages.

First of all, in a method and apparatus for processing a signal according to the present invention, in performing decoding by shifting a phase of a decoded audio signal or a speech signal based on phase shift flag, it is able to efficiently reproduce a phase or delay difference difficult to be efficiently reproduced by a decorrelator.

Secondly, in a method and apparatus for processing a signal according to the present invention, based on inter-channel phase difference (IPD) coding flag and inter-channel phase difference (IPD) mode flag, reverberation, which is difficult to be reconstructed using inter-channel level difference value and inter-channel correlation value, is reconstructed using inter-channel phase difference (IPD) value. And, it is also able to clearly perform sound image localization.

Thirdly, in a method and apparatus for processing a signal according to the present invention, by receiving inter-channel phase difference mode flag indicating whether inter-channel phase difference value is used for each frame, it is able to decode a signal using the inter-channel phase difference value if necessary.

Fourthly, in a method and apparatus for processing a signal according to the present invention, by modifying (smoothing) inter-channel phase difference value of a current parameter time slot using inter-channel phase difference value of a previous parameter time slot, it is able to remove the noise that may be transiently generated from a difference between the two inter-channel phase informations.

Fifthly, in a method and apparatus for processing a signal according to the present invention, by transmitting inter-channel phase difference value only if a predetermined condition is met, it is able to raise coding efficiency. And, it is also able to decode a signal close to an original sound.

Sixthly, in a method and apparatus for processing a signal according to the present invention, inter-channel phase difference value measured by an encoder is converted to inter-channel level difference value and the converted information is then transmitted. Therefore, even if a conventional signal processing apparatus and method, in which a transmission of inter-channel phase difference value is not allowed, are used, it is ale to reconstruct a signal having enhanced reverberation and sound image localization close to an original sound [backward compatibility].

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

Figure 1:
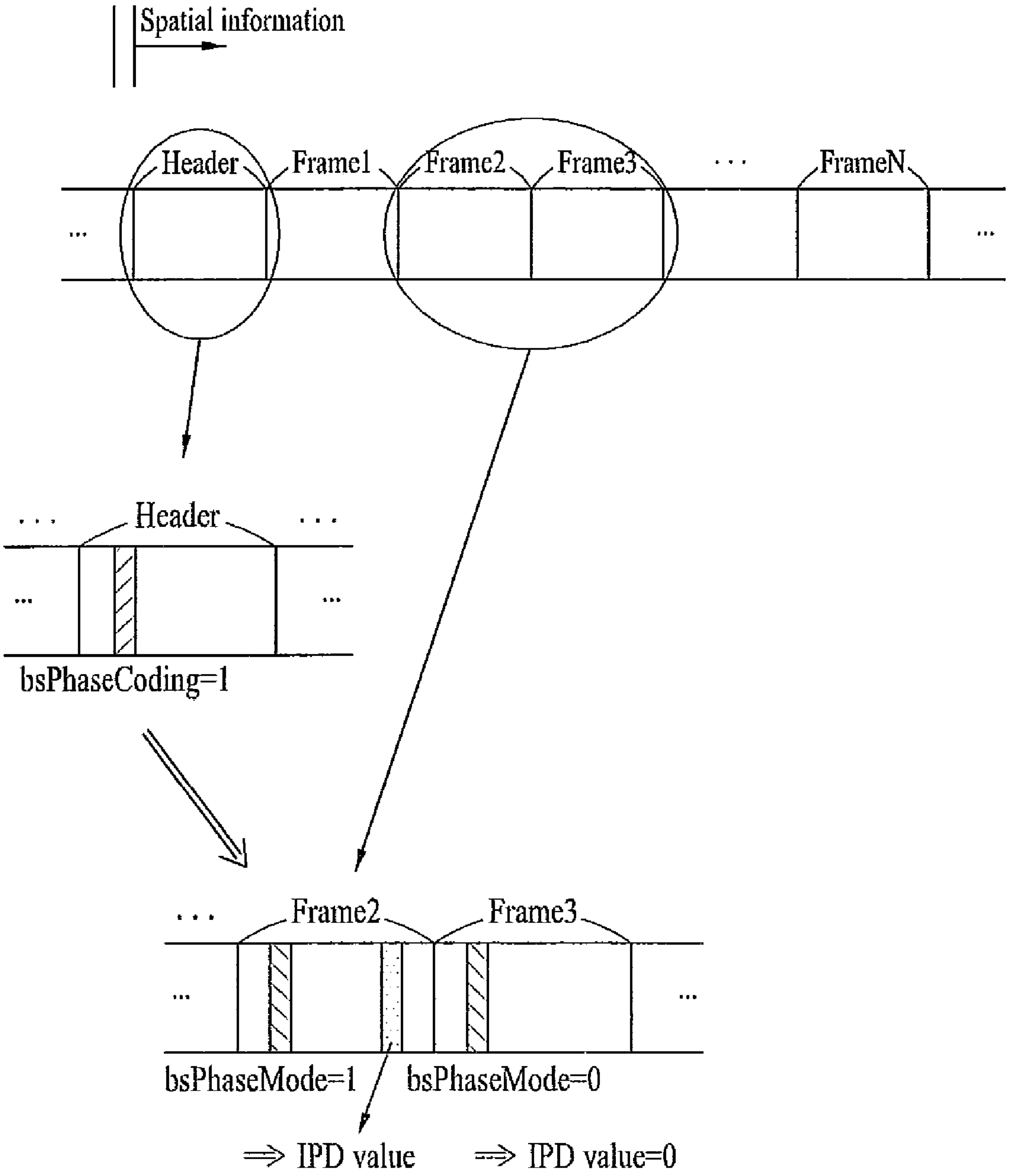
FIG. 1 is a diagram for concept of a signal processing method according to one embodiment of the present invention.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of processing a signal includes receiving (a) downmix signal being generated from plural-channel signal and (b) spatial information indicating attribute of the plural-channel signal in order to upmix the downmix signal and including phase shift flag indicating whether phase of a frame of at least one channel of the plural-channel signal is shifted; obtaining inter-channel phase difference (IPD) coding flag indicating whether IPD value is used to the spatial information from a header of the spatial information; obtaining IPD mode flag indicating whether the IPD value is used to frame of the spatial information from the frame based on the IPD coding flag; obtaining the IPD value of parameter band in the frame, based on the IPD mode flag; upmixing plural-channel signal by applying the IPD value to the downmix signal; and shifting the phase of the frame of the at least one channel of the plural-channel signal based on the phase shift flag. The spatial information is divided by header and a plurality of the frame. The IPD value indicates phase difference between two channels of the plural-channel signal. And, the parameter band is at least one sub-band of frequency domain including the IPD value.

According to another embodiment, the phase-shifted plural-channel signal is shifted the phase of the frame of the at least one channel by Π/2.

According to another embodiment, the phase-shifted plural-channel signal is shifted the phase of the frame of the at least one channel by a same phase for a whole frequency band.

It is to be understood that both the foregoing general description and the following detailed description are exemplary and explanatory and are intended to provide further explanation of the invention as claimed.

MODE FOR INVENTION

Reference will now be made in detail to the preferred embodiments of the present invention, examples of which are illustrated in the accompanying drawings. First of all, terminologies or words used in this specification and claims are not construed as limited to the general or dictionary meanings and should be construed as the meanings and concepts matching the technical idea of the present invention based on the principle that an inventor is able to appropriately define the concepts of the terminologies to describe the inventor's invention in best way. The embodiment disclosed in this disclosure and configurations shown in the accompanying drawings are just one preferred embodiment and do not represent all technical idea of the present invention. Therefore, it is understood that the present invention covers the modifications and variations of this invention provided they come within the scope of the appended claims and their equivalents at the timing point of filing this application.

First of all, it is understood that the concept 'coding' in the present invention includes both encoding and decoding.

Secondly, 'information' in this disclosure is the terminology that generally includes values, parameters, coefficients, elements and the like and its meaning can be construed as different occasionally, by which the present invention is non-limited. Stereo signal is taken as an example for a signal in this disclosure, by which examples of the present invention are non-limited. For example, a signal in this disclosure may include a plural channel signal having at least three or more channels.

FIG. 1 is a diagram for concept of a signal processing method according to one embodiment of the present invention.

Referring to FIG. 1, spatial information can be divided by a header and a plurality of frames. In this case, the spatial information is the information indicating an attribute of a plural channel signal that is an input signal. And, the spatial information can include inter-channel level difference value indicating a level difference between two channels of plural channels, inter-channel correlation value indicating correlation between the two channels, and inter-channel phase difference value indicating a phase difference between the two channels. This spatial information is usable in reconstructing a downmix signal, which was generated from downmixing a plural channel signal by a decoder, by upmixing.

The header of the spatial information includes an inter-channel phase difference coding flag (bsPhaseCoding) indicating whether a frame for using the inter-channel phase difference value exists in the whole frames. In particular, since the inter-channel phase difference coding flag is included in the header, it is able to determine whether the inter-channel phase difference value is used for at least one of all frames of the spatial information. The meaning of the inter-channel phase difference coding flag is shown in Table 1.

TABLE 1

| bsPhaseCoding | Meaning |
|---|---|
| 1 | This indicates that IPD coding is used to spatial information. Namely, this indicates that IPD value is used for at least one of all frames. |
| 0 | This indicates that IPD coding is not used to spatial information. Namely, this indicates that IPD value is not used for all frames. |

Moreover, an inter-channel phase difference mode flag (bsPhaseMode), which indicates whether the inter-channel phase difference value is used for a frame, is included in each of the frames of the spatial information. The inter-channel phase difference mode flag is included in the frame only if the inter-channel phase difference coding flag is set to 1, i.e., the inter-channel phase difference coding flag indicates that the IPD coding is used to spatial information. Detailed meaning of the inter-channel phase difference mode flag (bsPhaseMode) is shown in Table 2.

TABLE 2

| bsPhaseMode | Meaning |
|---|---|
| 1 | This indicates that IPD value is used for a current frame. |
| 0 | This indicates that IPD value is not used for a current frame. |

Referring now to FIG. 1, if an inter-channel phase difference mode flag of Frame 2 is set to 1 [bsPhaseMode=1], inter-channel phase difference value (IPD) is included as a non-zero value in the Frame 2. If an inter-channel phase difference mode flag of Frame 3 is set to 0 [bsPhaseMode=0], inter-channel phase difference value (IPD) in the Frame 3 has a value set to 0.

Therefore, the inter-channel phase difference value is obtained based on the inter-channel phase difference coding flag and the inter-channel phase difference mode flag and is then applied to a downmix signal to upmix into a plural channel signal.

Figure 2:
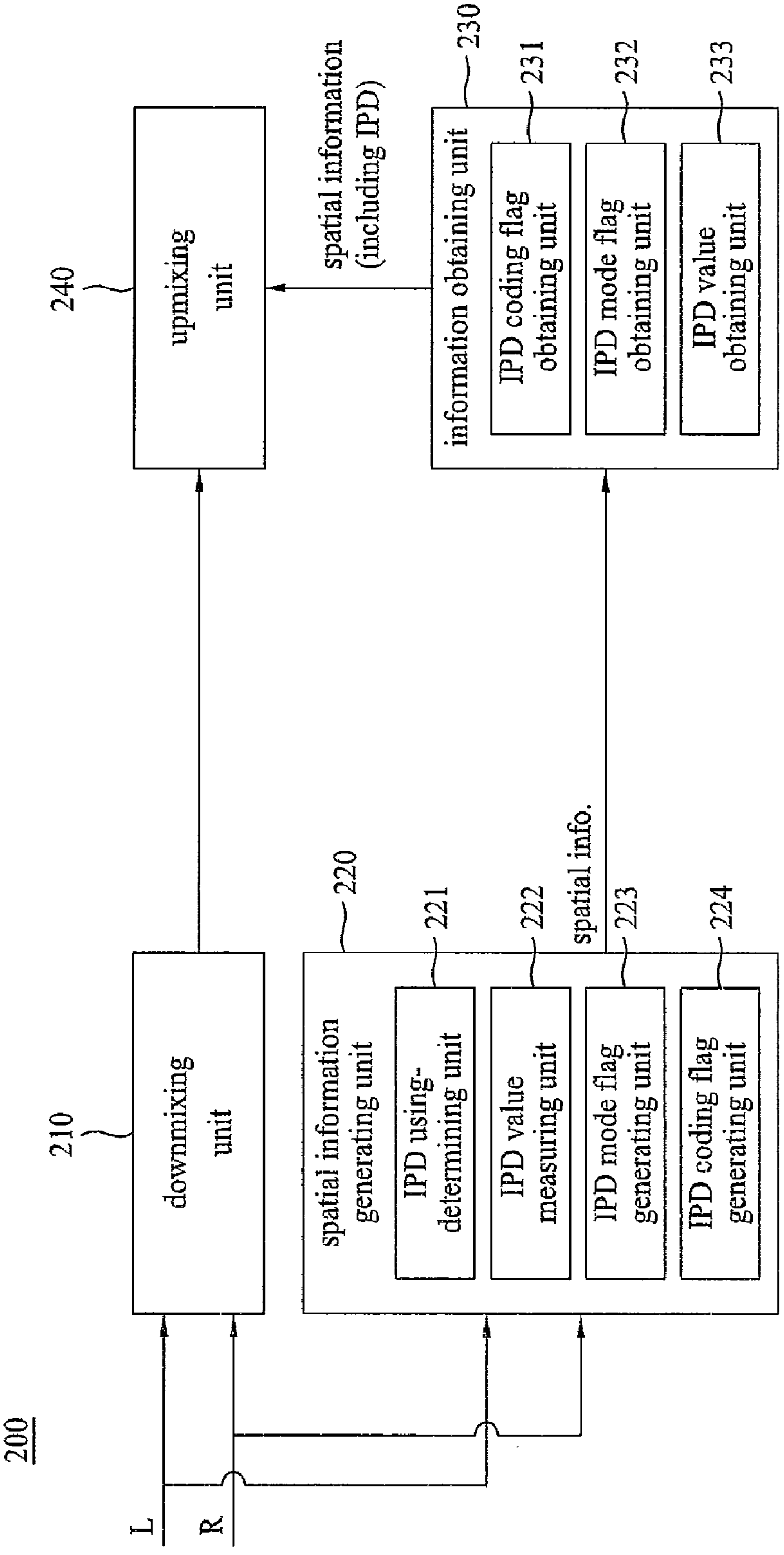
FIG. 2 is a block diagram of an apparatus for processing a signal according to one embodiment of the present invention.

FIG. 2 is a block diagram of an apparatus for processing a signal according to one embodiment of the present invention.

Referring to FIG. 2, a signal processing apparatus 200 includes a downmixing unit 210, a spatial information generating unit 220, an information obtaining unit 230 and an upmixing unit 240.

The downmixing unit 210 receives an input of a plural channel signal and is then able to generate a downmix signal (DMX). In this case, the plural channel signal includes a signal having at least three or more channels. And, the plural channel signal can include a signal having a mono or stereo channel. The downmixing unit 210 is able to generate a downmix signal having channels less than those of the plural channel signal by downmixing the plural channel signal.

As mentioned in the foregoing description with reference to FIG. 1, the spatial information generating unit 220 generates spatial information to upmix the downmix signal in a decoder later. And, this spatial information can indicate an attribute of the plural channel signal. As mentioned in the foregoing description, the spatial information can include inter-channel level difference value, inter-channel correlation value, inter-channel phase difference value, etc. In this disclosure, the inter-channel phase difference value is explained in detail with reference to the spatial information generating unit 220 shown in FIG. 2 as follows.

First of all, the spatial information generating unit 220 includes an IPD using-determining unit 221, an IPD value measuring unit 222, an IPD mode flag generating unit 223 and an IPD coding flag generating unit 224.

The IPD using-determining unit 221 is able to determine whether the inter-channel phase difference (IPD) value shall be included in the spatial information. In particular, the IPD using-determining unit 221 is able to determine whether the inter-channel phase difference (IPD) value shall be included in the spatial information based on a characteristic of the plural channel signal, and more particularly, on a ration the inter-channel phase difference value and the inter-channel level difference value. For instance, if the plural channel signal is a speech signal, it is able to determine that the inter-channel phase difference (IPD) value shall be included in the spatial information. This will be explained in detail later.

If the IPD using-determining unit 221 determines to use the inter-channel phase difference value, the IPD value measuring unit measures a phase difference between two channels from the plural channel signal inputted to the spatial information generating unit 200. In this case, the measured phase difference can include a phase and/or angle, a time difference or an index value corresponding to the angle or the time difference. In a signal, a phase and a time have a close relation, which will be explained in detail with reference to FIG. 3 later.

The IPD mode flag generating unit 223 generates the inter-channel phase difference mode flag (bsPhaseMode) described with reference to FIG. 1. In particular, the inter-channel phase difference mode flag indicates whether the inter-channel phase difference value is used for a frame. And, this frame may be a current frame in which the inter-channel phase difference value is included. Therefore, the inter-channel phase difference mode flag can variably exist for each frame. Particularly, the inter-channel phase difference mode flag may not be included in the frame, when the inter-channel phase difference coding flag indicates that the IPD value is not used to all frames of the spatial information. And, the inter-channel phase difference mode flag can have a value set to 0 or 1.

And, the IPD coding flag generating unit 224 generates the inter-channel phase difference coding flag (bsPhaseCoding) described with reference to FIG. 1. In particular, since IPD coding flag indicating whether the inter-channel phase difference coding is used to the spatial information is generated, if the inter-channel phase difference value is used for at least one of the frames of the spatial information partitioned in FIG. 1, it is a matter of course that the inter-channel phase difference coding flag indicates 1.

The information obtaining unit 230 receives an input of the spatial information from the spatial information generating unit 220. In this case, the inter-channel phase difference coding flag (bsPhaseCoding) and the inter-channel phase difference mode flag (bsPhaseMode) can be included in the spatial information as well as the inter-channel phase (IPD) value. The information obtaining unit 230 includes an IPD coding flag obtaining unit 231, an IPD mode flag obtaining unit 232 and an IPD value obtaining unit 233.

The IPD coding flag obtaining unit 231 obtains an inter-channel phase difference coding flag that indicates whether the inter-channel phase difference value is used for at least one frame of all frames of the spatial information, from a header of the spatial information. The meaning of the inter-channel phase difference coding flag is shown in Table 1.

The IPD mode flag obtaining unit 232 obtains an inter-channel phase difference mode flag that indicates whether the inter-channel phase difference value is used for a frame, from the frame of the spatial information. In particular, if the inter-channel phase difference coding flag indicates that the inter-channel phase difference value is used [bsPhaseCoding=1], the IPD mode flag obtaining unit 232 is able to obtain the inter-channel phase difference mode flag.

And, the IPD value obtaining unit 233 is able to obtain the inter-channel phase difference value based on the inter-channel phase difference mode flag. The inter-channel phase difference value can exist for parameter band. In this disclosure, a parameter band indicates at least one sub-band to which the inter-channel phase difference value is included. This will be explained in detail with reference to FIG. 7 and FIG. 8 later.

And, the upmixing unit 240 is able to generate a plural channel signal by applying the inter-channel phase difference value obtained by the information obtaining unit 230 to the downmix signal inputted from the downmixing unit 210. In this case, the upmixing means that an upmixing matrix is applied to generate a signal having channels more than those of the downmix signal. And, an upmixed signal indicates a signal to which the upmixing matrix is applied. The plural channel signal is the signal having channels more than those of the downmix signal. And, the plural channel signal can indicate a signal to which the upmixing matrix itself is applied. The plural channel signal may include a QMF-domain signal generated to have a plurality of channels by applying the upmixing matrix thereto or a final signal transformed into a time-domain signal from the QMF-domain signal.

Thus, the signal processing apparatus and method according to the present invention uses the inter-channel phase difference value based on the inter-channel phase difference coding flag and the inter-channel phase difference mode flag. Therefore, the present invention restores the reverberation difficult to be restored using the inter-channel level difference value and the inter-channel correlation value. And, the present invention is able to clearly perform sound image localization.

Figure 3:
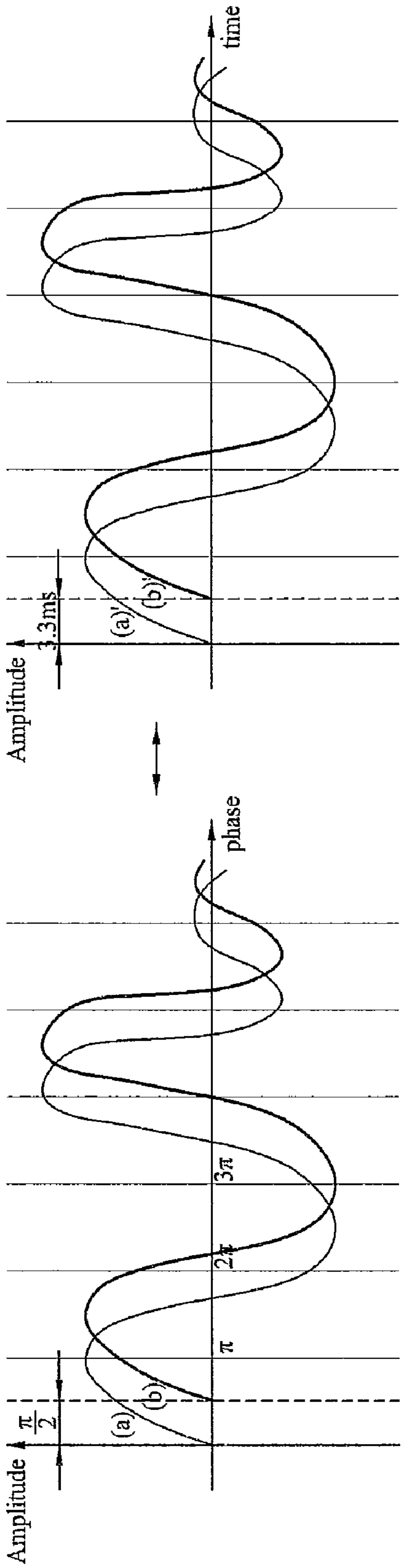
FIG. 3 is a graph for a relation between a phase and a time in a signal.

FIG. 3 is a graph for a relation between a phase and a time in a signal. A left graph shows a signal in phase-amplitude domain. A signal (a) is a signal inputted without a phase variation. And, a signal (b) indicates a signal having a phase further delayed by π/2 than the signal (a).

Meanwhile, a right graph shown in FIG. 3 indicates a signal in time-amplitude domain and represents signals (a)' and (b)' corresponding to the signals (a) and (b) in the left graph, respectively. In particular, the signal (b), which is the signal further delayed by π/2 than the signal (a), can be represented equal to the signal (b)' that is the signal inputted further delayed by 33 ms than the signal (a)'. Thus, the phase and time have close relation in signal and provide the same effect even if they are transformed into values corresponding to each other.

Figure 4:
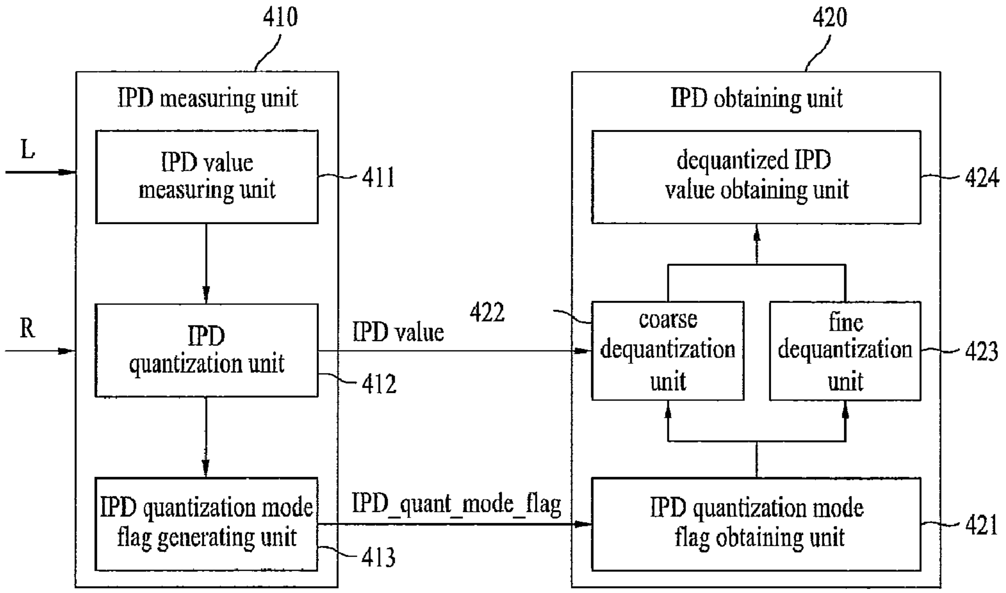
FIG. 4 is a detailed block diagram of an IPD measuring unit and an IPD obtaining unit shown in FIG. 2.

FIG. 4 is a detailed block diagram of the IPD value measuring unit 222 and the IPD value obtaining unit 233 shown in FIG. 2. Referring to FIG. 4, the IPD measuring unit 410 includes an IPD value measuring unit 411, an IPD quantization unit 412 and an IPD quantization mode flag generating unit 413.

The IPD value measuring unit 411 measures the inter-channel phase difference value from the inputted plural channel signal. As mentioned in the foregoing description, the inter-channel phase difference value may include a phase angle, a time delay value or an index value corresponding to the phase angle or the time delay value.

The IPD quantization unit 412 quantizes the inter-channel phase difference value measured by the IPD value measuring unit 411. The IPD quantization unit 412 can further include a detailed structure for quantizing the inter-channel phase difference value by a difference method according to a quantization interval. For instance, a first quantization unit (not shown in the drawing) is able to quantize the inter-channel phase difference value using a fine quantization interval (fine interval) and a second quantization unit is able to quantize the inter-channel phase difference value using a coarse quantization interval (coarse interval).

And, the IPD quantization mode flag generating unit 413 is able to generate a quantization mode flag (IPD_quant_mode_flag) indicating a scheme of quantizing the inter-channel phase difference value. In particular, the quantization mode flag is able to indicate whether the inter-channel phase difference value is quantized using a fine interval or a coarse interval.

The inter-channel phase difference value obtaining unit 420 includes an IPD quantization mode flag obtaining unit 421, a first dequantization unit 422, a second dequantization unit 423 and a dequantized IPD value obtaining unit 424.

First of all, the IPD quantization mode flag obtaining unit 421 obtains a quantization mode flag (IPD_quant_mode_flag) indicating a quantization scheme applied to the inter-channel phase difference value from the spatial information received from the encoder. The meaning of the quantization mode flag is shown in Table 3.

TABLE 3

| IPD_quant_mode_flag | Meaning |
|---|---|
| 1 | This value indicates that inter-channel phase difference value is quantized using a fine interval. |
| 0 | The value indicates that inter-channel phase difference value is quantized using a coarse interval. |

If the quantization mode flag is set to 0 (IPD_quant_mode_flag=0), the first dequantization unit 422 receives inter-channel phase difference value and then dequantizes the inter-channel phase difference value using the coarse interval. On the contrary, if the quantization mode flag is set to 1 (IPD_quant_mode_flag=1), the second dequantization unit 423 receives inter-channel phase difference value and then dequantizes the inter-channel phase difference value using the fine interval.

Subsequently, the dequantized IPD value obtaining unit 424 is able to obtain the dequantized inter-channel phase difference value from the first dequantization unit 42 or the second dequantization unit 423.

Figure 5:
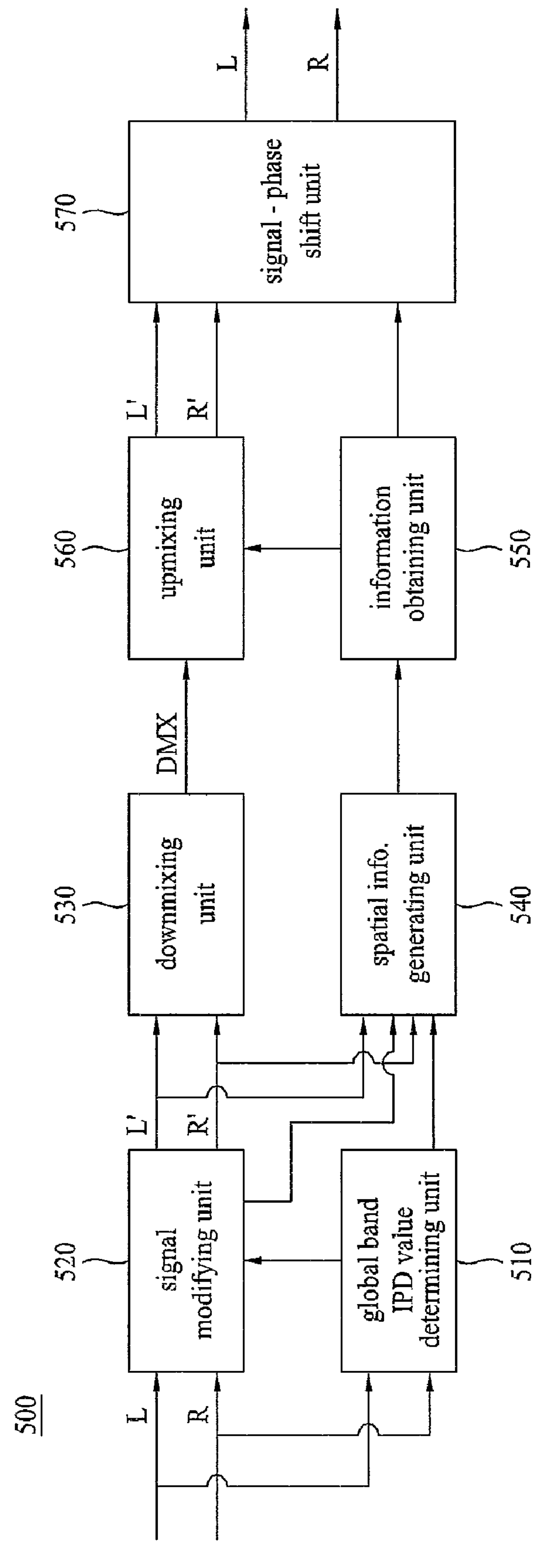
FIG. 5 is a block diagram of a signal processing apparatus according to another embodiment of the present invention.

FIG. 5 is a block diagram of a signal processing apparatus 500 for compensating phase reconstruction of a plural channel signal using phase shift flag.

Referring to FIG. 5, a signal processing apparatus 500 includes a global band IPD value determining unit 510, a signal modifying unit 520, a downmixing unit 530, a spatial information generating unit 540, a spatial information obtaining unit 560 and a phase shift unit 570.

First of all, the global band IPD value determining unit 510 receives an input of a plural channel signal. In this case, the plural channel signal may include a signal having at least one out-of-phase channel and, particularly, may include a stereo signal or a signal having at least three or more channels. The global band IPD value determining unit 510 determines phase shift flag indicating an extent of a phase, which is to be shifted to make the inputted plural channel signal in phase, from the plural channel signal.

The phase shift flag can include flag information indicating that a phase of the plural channel signal has been shifted and is able to further include such information relevant to a phase shift as a phase-shifted extent, a phase-shifted channel signal, a phase-shift occurring frequency band, time information corresponding to a phase shift and the like as well as the flag information.

First of all, in case that the phase shift flag indicates flag information only, a phase of the plural channel signal can be shifted using a fixed value. For instance, in case that a plural channel signal is a stereo signal, it is able to generate the plural channel signal by shifting a phase in a manner that right and left channels become orthogonal to each other by decreasing a phase of a right channel of the stereo signal by π/2 or increasing a phase of a left channel thereof by π/2. Instead of being limited to the π/2 phase shift, it is able to generate the plural channel signal by shifting a phase to enable the right and left channels to become orthogonal to each other.

In doing so, the shifted phase is equally applicable to whole frequency bands of the plural channel signal. Moreover, instead of transferring information indicating that a phase of at least one channel of the plural channel signal is modified by π/2 or information on a phase shifted to become orthogonal, it is able to use information preset in a decoder side later, by which the present invention is non-limited.

In this case, an information transport size can be reduced less than that of carrying inter-channel phase difference value on each of a plurality of parameter bands. And, it is also able to prevent a problem of a phase difference that may occur in case of applying inter-channel difference information for each parameter band.

Besides, the phase shift flag can further include detailed information associated with a phase shift as well as the flag information. In this case, the detailed information can include shift information of phase, information on a phase-shifted channel signal, information on frequency band and time on which a phase shift occurs, and the like.

Meanwhile, the phase shift flag can variably indicate a shifted extent of a phase of a plural channel signal for each frame. In case that the phase shift flag includes the flag information only, it is able to indicate whether a phase is shifted per frame. In case that the phase shift flag includes flag information and detailed information on a phase shift, the detailed information can indicate a shifted extent of a phase per subband or parameter band or can indicate a shifted extent of a phase on a corresponding time variably per predetermined time range, e.g., a frame, a time slot, etc.

Moreover, the phase shift flag can be used in parallel with the inter-channel phase difference value explained with reference to FIGS. 1 to 4.

The signal modifying unit 520 receives the phase shift flag and the plural channel signal. The plural channel signal is able to generate a phase shifted plural channel signal by modifying a phase of at least one channel using the phase shift flag. Although the method of modifying a phase of a plural channel signal to enable an out-of-phase plural channel signal to become an in-phase plural channel signal and generating phase shift flag relevant to the plural channel signal is mentioned in the foregoing description, an in-phase plural channel signal is intentionally shifted to become an out-of-phase signal and it is then able to generate phase shift flag corresponding to the out-of-phase signal.

The downmixing unit 530 receives an input of the phase shifted plural channel signal and is then able to generate a downmix signal by downmixing the inputted signal. In this case, the plural channel signal is not limited to a stereo signal but can include a signal having at least three channels. If the plural channel signal is a stereo signal, the downmix signal can include a mono signal. If the plural channel signal is a signal having at least three channels, the downmix signal can include a signal having channels less than those of the plural channel signal.

The spatial information generating unit 540 is able to generate spatial information indicating an attribute of the plural channel signal by receiving an input of the phase shifted plural channel signal. The spatial information is provided for a decoder to decode the downmix signal into the phase shifted plural channel signal and can include inter-channel level difference value, inter-channel correlation value, a channel prediction coefficient, etc. Therefore, the spatial information generated by the spatial information generating unit 540 of the present invention may not be equal to spatial information generated from a non-phase-shifted plural channel signal.

Moreover, a bitstream generating unit (not shown in the drawing) is able to generate one bitstream containing the spatial information and the phase shift flag or one bitstream containing the downmix signal, the spatial information and the phase shift flag.

The information obtaining unit 550 obtains the spatial information and the phase shift flag from the bitstream to upmix the downmix signal.

The upmixing unit 560 has the same configuration of the former upmixing unit 240 shown in FIG. 2 and performs the same functions of the former upmixing unit 240 shown in FIG. 2. The upmixed plural channel signal can be the signal to which the upmixing matrix is applied. The upmixed plural channel signal can be a QMF-domain signal generated by upmixing. And, the upmixed plural channel signal can be a final signal generated as a time-domain signal. Moreover, the signal upmixed by the upmixing unit 560 can include the plural channel signal phase-shifted by the signal modifying unit 520.

The phase shift unit 570 receives an input of the phase shift flag from the information obtaining unit 550 and an input of the phase shifted plural channel signal from the upmixing unit 560. Subsequently, the phase shift unit 570 reconstructs the shifted phase of the plural channel signal by applying the phase shift flag to the phase shifted plural channel signal.

As mentioned in the foregoing description, the phase shift flag can just include flag information indicating whether a phase of at least one channel of a plurality channel signal is shifted or can further include detailed information relevant to the phase shift. If the flag information is included only, the phase shift unit 570 determines whether to shift a phase of the upmixed plural channel signal based on the flag information and is then able to shift the phase of the at least one channel of the plural channel signal using a fixed value. In this case, a value preset by a decoder is usable as the fixed value instead of being measured and transferred by an encoder separately. For instance, it is able to increase or decrease a phase of at least one channel of a plural channel signal by π/2. In this case, it is able to equally apply the π/2 to all frequency bands of the plural channel signal. Moreover, since the phase shift flag can be determined per frame, an extent of a phase shift of a plural channel signal or a presence or non-presence of a phase shift can be variably indicated for each frame.

Figure 6:
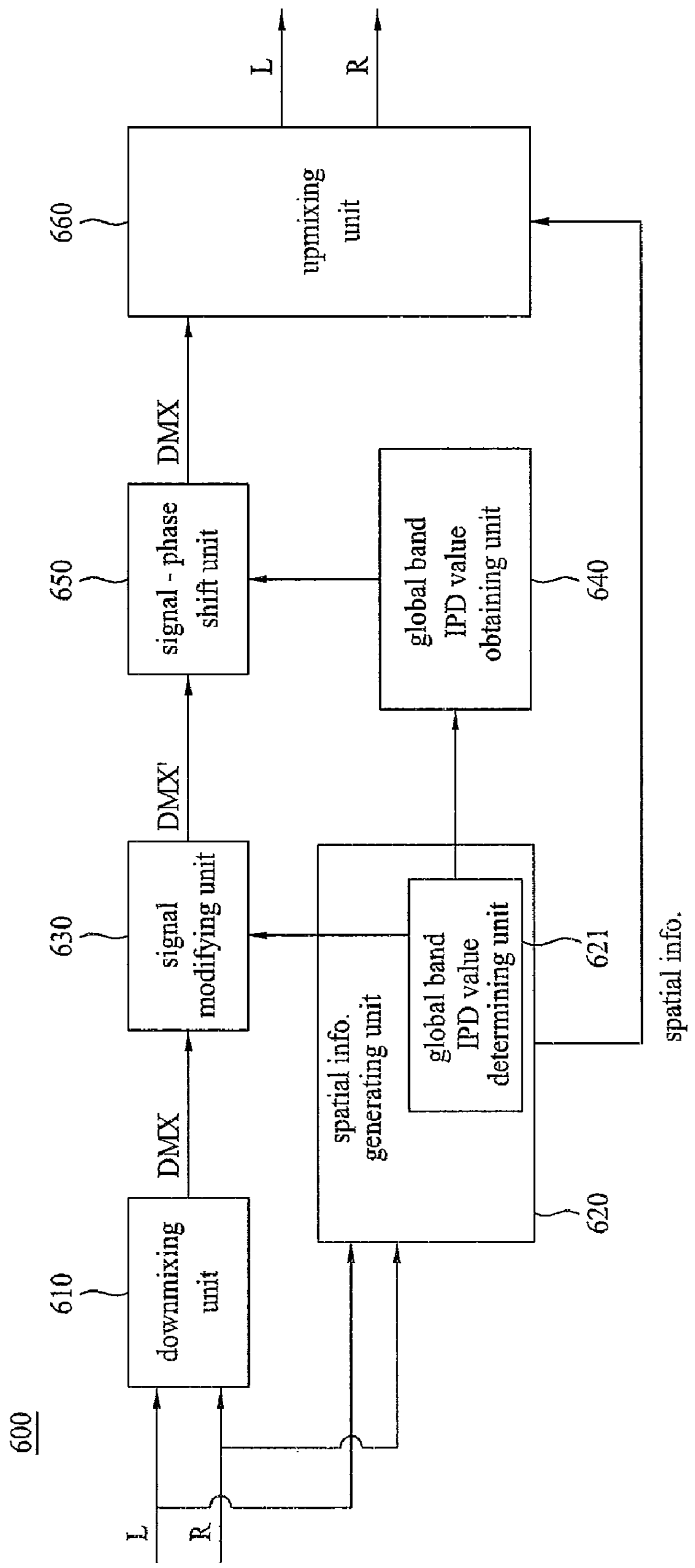
FIG. 6 is a block diagram of a signal processing apparatus according to another embodiment of the present invention.

FIG. 6 is a block diagram of a signal processing apparatus 600 for compensating phase reconstruction of a plural channel signal using phase shift flag according to another embodiment of the present invention.

Referring to FIG. 6, a signal processing apparatus 600 includes a downmixing unit 610, a spatial information generating unit 620, a signal modifying unit 630, a global band IPD value obtaining unit 640, a phase shift unit 650 and an upmixing unit 660.

First of all, the downmixing unit 610 generates a downmix signal DMX by downmixing an inputted plural channel signal. In this case, the plural channel signal is a signal that is inputted without having its phase shifted.

The spatial information generating 620 is able to generate spatial information indicating an attribute of the inputted plural channel signal. This spatial information has the same configuration and function of the former spatial information shown in FIG. 5 but differs from the former spatial information in being generated from a non-phase-shifted plural channel signal. Meanwhile, the spatial information generating unit 620 includes a global band IPD value determining unit 621. This global band IPD value determining unit 621 has the same configuration and function of the former global band IPD value determining unit shown in FIG. 5, of which details are omitted in the following description.

The signal modifying unit 630 is able to generate a phase modified downmix signal DMX' by modifying a phase of at least one channel of the downmix signal outputted from the downmixing unit 610 based on the phase shift flag outputted from the global band IPD determining unit 621.

Subsequently, the global band IPD value obtaining unit 640 obtains phase shift flag. The phase shift unit 650 is then able to reconstruct the down mix signal DMX by shifting the phase of the at least one channel of the inputted modified downmix signal DMX' based on the phase shift flag. In this case, the downmix signal having its phase shifted by the phase shift unit 650 can be equal to the signal DMX inputted to the signal modifying unit 630.

The upmixing unit 660 is able to decode the plural channel signal by receiving the spatial information from the spatial information generating unit 620 and the downmix signal DMX from the phase shift unit 650.

Meanwhile, a signal processing apparatus and method according to the present invention performs various methods for removing noise transiently generated from a point where inter-channel phase difference value varies. This is explained with reference to FIGS. 7 to 9 as follows.

Figure 7:
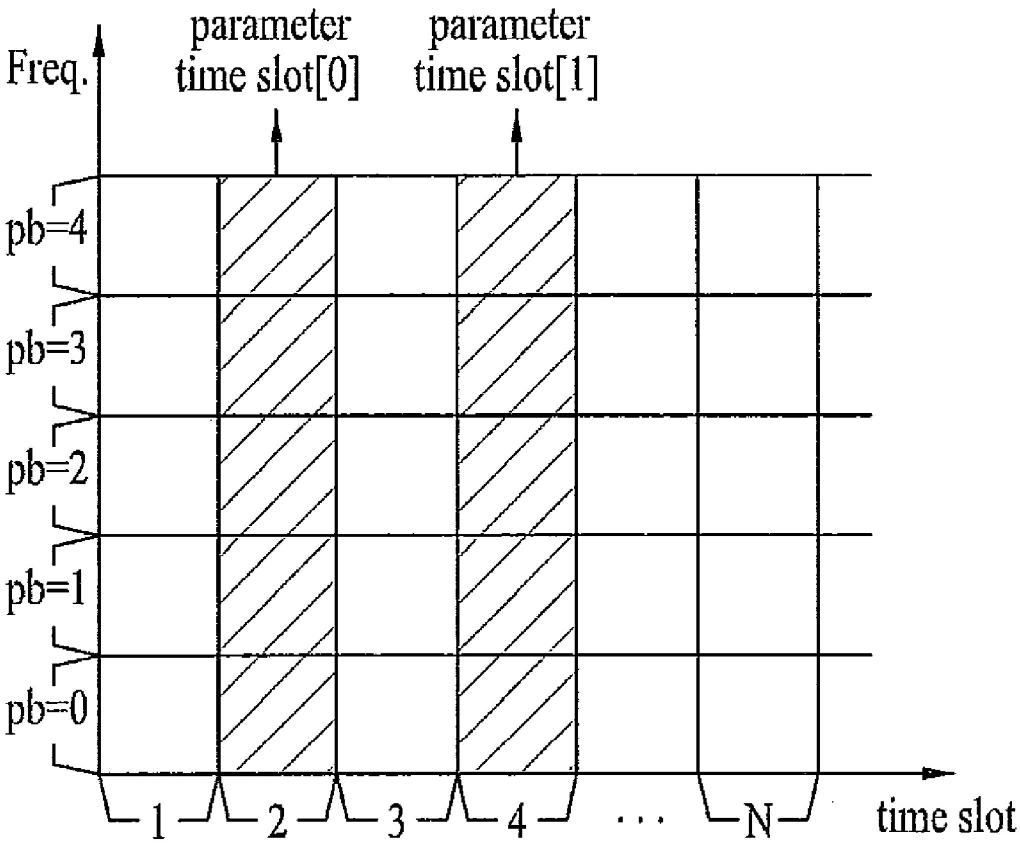
FIG. 7 is a diagram for a concept of a parameter time slot according to a related art.

First of all, FIG. 7 is a diagram for a concept of a parameter time slot, in which a signal can be represented in a time-frequency domain.

Referring to FIG. 7, a parameter set is applied two (time slot 2 and time slot 4) of N time slots of one frame. And, a whole frequency range of a signal is divided into 5 parameter bands. Hence, a unit of a time axis is a time slot, a unit of a frequency axis is a parameter band (pb), and the parameter band can be at least one frequency-domain sub-band to which the same inter-channel phase difference is included. And, a time slot, which is defined to enable the parameter set, and more particularly, the inter-channel phase difference value to be applied thereto, is named a parameter time slot.

Figure 8:
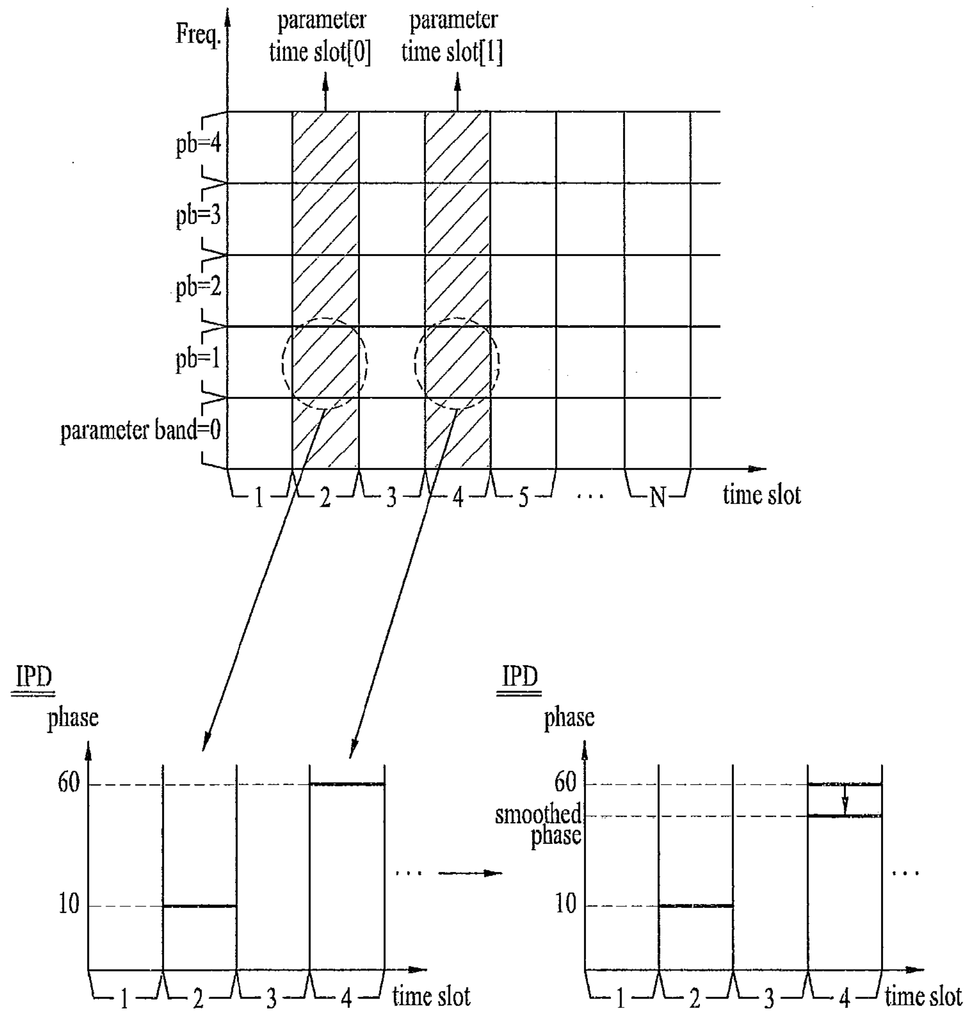
FIG. 8 is a schematic diagram for a method of modifying (smoothing) inter-channel phase difference value according to another embodiment of the present invention.

FIG. 8 is a schematic diagram for a method of information according to another embodiment of the present invention.

Referring to FIG. 8, a bottom-left graph shows inter-channel phase difference value included in a second parameter band in parameter time slots. The inter-channel phase difference value applied to a parameter time slot [0] can be 10°, and the inter-channel phase difference value applied to a parameter time slot [1] can be 60°. Thus, at the point where the inter-channel phase difference value varies considerably, an unexpected noise may be generated. Therefore, the signal processing method and apparatus according to the present invention provide the effect of removing the noise by smoothing the inter-channel phase difference value applied to a current parameter time slot using the inter-channel phase difference value applied to a previous parameter time slot.

Referring now to FIG. 8, assuming that a current parameter time slot is the time:slot [1], a previous parameter time slot can be the parameter time slot [0]. Looking into a bottom right graph shown in FIG. 8, the inter-channel phase difference value (60° applied to the previous parameter time slot can be smoothed using the inter-channel phase difference value (10°) applied to the previous parameter time slot. Hence, the smoothed inter-channel phase difference value of the current parameter time slot can have a value smaller than 60°.

Subsequently, by interpolating and/or copying the smoothed inter-channel phase difference values applied to the current and/or previous parameter time slot, it is able to obtain inter-channel phase difference value to be applied to such a time slot, which is defined not to have a parameter set applied thereto, as time slot 1, time slot 3, . . . time slot N.

Figure 9:
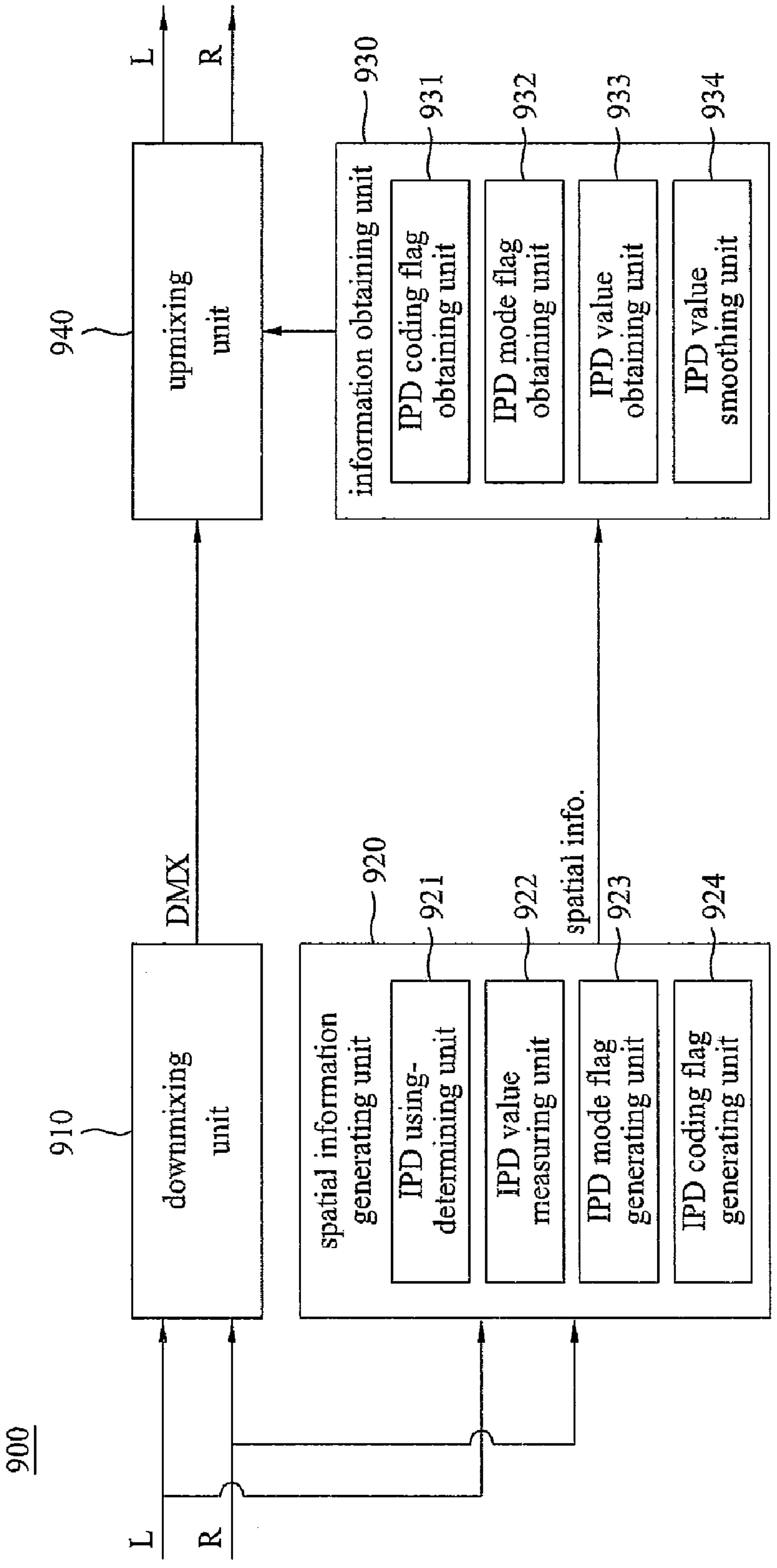
FIG. 9 is a block diagram of a signal processing apparatus according to another embodiment of the present invention shown in FIG. 8.

FIG. 9 is a block diagram of a signal processing apparatus according to another embodiment of the present invention shown in FIG. 8.

Referring to FIG. 9, a downmixing unit 910, an IPD using-determining unit 921, an IPD value measuring unit 922, an IPD mode flag generating unit 923, an IPD coding flag generating unit 924, an IPD coding flag obtaining unit 931, an IPD mode flag obtaining unit 932, an IPD value obtaining unit 933 and an upmixing unit 940 in FIG. 9 have the same configurations and functions of the downmixing unit 210, the IPD using-determining unit 221, the IPD value measuring unit 222, the IPD mode flag generating unit 223, the IPD coding flag generating unit 224, the IPD coding flag obtaining unit 231, the IPD mode flag obtaining unit 232, the IPD value obtaining unit 233 and the upmixing unit 240 in FIG. 2, respectively. Their details are omitted in the following description.

An information obtaining unit 930 is able to further include an IPD smoothing unit 934. The IPD value smoothing unit 934 is able to modify (smooth) inter-channel phase difference value applied to a current parameter time slot using inter-channel phase difference value applied to a previous parameter time slot. This, if there exists a large gap between the inter-channel phase difference value applied to the current parameter time slot and the inter-channel phase difference value applied to the previous parameter time slot, it is able to prevent noise from being possibly generated.

The IPD value smoothing unit 934 is able to generate correction angle indicating an angle between two of plural channels from the inter-channel phase difference value applied to the current parameter time slot and is then able to modify the correction angle using a correction angle of the previous parameter time slot. The modified correction angle is then outputted to the upmixing unit 840. The modified phase angle is applied to a downmix signal by the upmixing unit 640 to generate a plural channel signal.

In the following description, in case of coding a signal using inter-channel level difference value and inter-channel correlation value instead of using inter-channel phase difference value in general, various embodiments for solving possible problems according to the present invention are explained.

Figure 10:
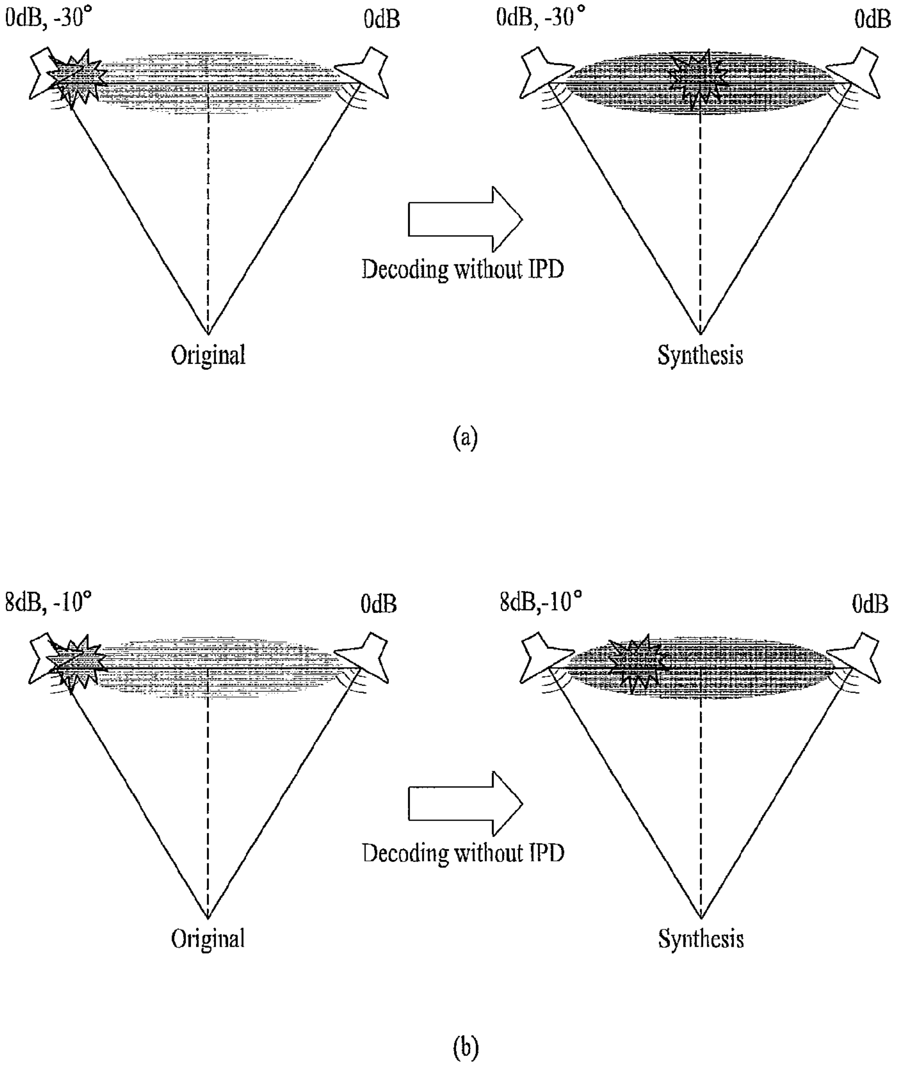
FIG. 10 is a diagram for a concept of a problem solved by a signal processing apparatus and method according to another embodiment of the present invention.

FIG. 10A and FIG. 10B are diagram for the concept of problems solved by a signal processing apparatus and method according to another embodiment of the present invention.

In many kinds of signal coding devices, and more particular, in EAAC+ standardized by 3GPP and MPEG or PS used by AAC Plus and USAC, inter-channel level difference value and inter-channel correlation value are used as spatial information only instead of using inter-channel phase difference value. This is attributed to the phase wrapping, which may be generated in generating inter-channel phase difference value, and the sound quality degradation generated from synthesizing inter-channel phase difference value.

Yet, if a plural channel signal is coded without using inter-channel phase difference value, a serious sound image localization problem may be caused. In other words, such a signal, which is mainly coded using inter-channel level difference value, as a signal recorded by arranging at least two microphones close to each other may not have a problem. Yet, it is unable to correctly perform sound image localization on a signal recorded by arranging at least two microphones spaced apart from each other in decoding of a plural channel signal unless using inter-channel phase difference value.

FIG. 10A shows a result of a case that a stereo signal having inter-channel phase difference value only is decoded without inter-channel phase difference value.

Referring to FIG. 10A, an original signal is the signal configured with inter-channel phase difference value only (IPD=30°). Yet, if decoding is performed using inter-channel level difference value and inter-channel correlation value only, there is no valid spatial information (IPD), a sound image of a decoded signal (synthesis signal) is located at a center of the stereo signal irrespective of the original signal. In this case, although the inter-channel correlation value affects the sound image localization, it is impossible to perform correct sound image localization without the inter-channel phase difference value.

FIG. 10B shows a result of a case that a stereo signal having inter-channel phase difference value and inter-channel level difference value mixed therein is decoded without inter-channel phase difference value.

Referring to FIG. 10B, sound image localization of a stereo signal is determined as a linear sum of an adjustment angle determined from inter-channel phase difference value and an adjustment angle determined from inter-channel level difference value. If a left signal of an original stereo signal has a value greater by 8 dB than a right signal thereof and is faster by 0.5 ms than the right signal, as shown in FIG. 10B, a level difference of 8 dB can shift a sound image to the left by 20° (−20°) from a center. And, the time difference of 0.5 ms (equal to the inter-channel phase difference value of '−10°') is able to shift a sound image to the left by 10° (−10°). Hence, the original stereo signal (Original) is located at a position of −30°. Yet, if a signal is decoded without inter-channel phase difference value, a sound image of the decoded signal is located at −20°, it is impossible to perform correct sound image localization.

Therefore, a signal processing method and apparatus according to another embodiment of the present invention provide various methods for solving the sound image localization problem in addition.

Figure 11:
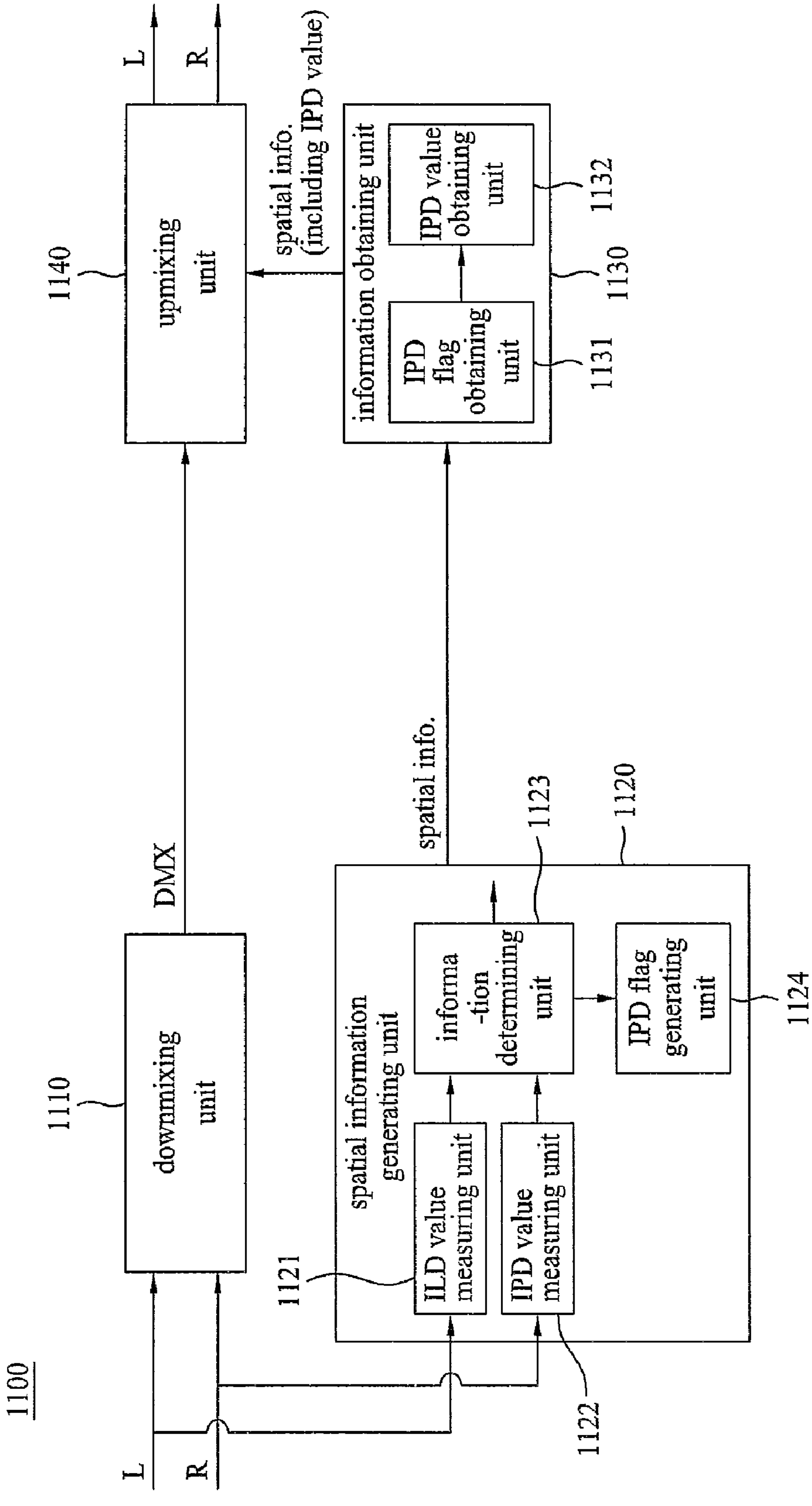
FIG. 11 and FIG. 12 are block diagrams of a signal processing apparatus according to another embodiment of the present invention.
Figure 12:
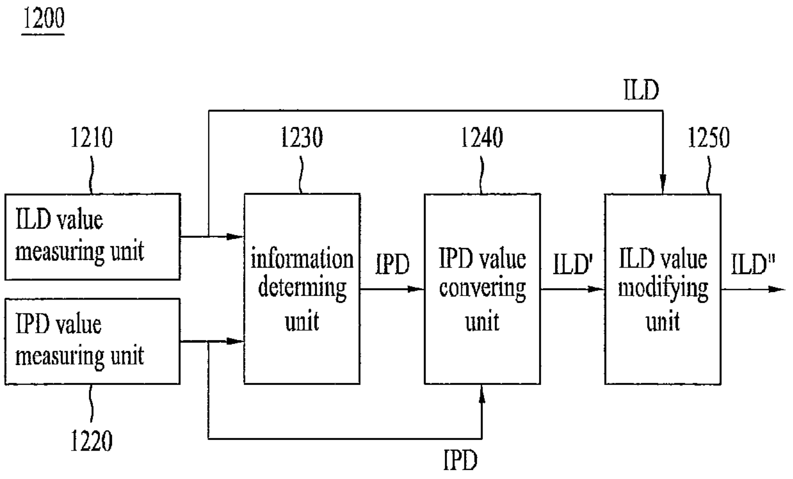

FIG. 11 and FIG. 12 are block diagrams of a signal processing apparatus and method according to another embodiment of the present invention.

First of all, only if a predetermined condition is met based on a ration between inter-channel phase difference value of a plural channel signal and inter-channel level difference value of the plural channel signal, it is able to use the inter-channel phase difference value.

Referring to FIG. 11, a signal processing apparatus 1100 includes a downmixing unit 1110, a spatial information generating unit 1120, an information obtaining unit 1130 and an upmixing unit 1140.

The downmixing unit 1110 and the upmixing unit 1140 have the same configurations and functions of the former downmixing unit 210 and the former upmixing unit 240 in FIG. 2. The spatial information generating unit 1120 includes an ILD value measuring unit 1121, an IPD value measuring unit 1122, an information determining unit 1123 and an IPD flag generating unit 1124. The ILD value measuring unit 1121 and the IPD value measuring unit 1122 measure inter-channel level difference value and inter-channel phase difference value from a plural channel signal, respectively. In this case, the inter-channel level difference value and the inter-channel phase difference value can be measured for each parameter band.

The information determining unit 1123 calculates how far a signal is sound-image-localized using the measured inter-channel level difference value and the measured inter-channel phase difference value and also calculates a ratio of the inter-channel level/phase difference information to a total sound image localization. The information determining unit 1123 then determines to use the inter-channel phase difference value only if the ratio of the inter-channel phase difference value is higher than the other. For instance, if the measured inter-channel phase difference value corresponds to +20° and the measured inter-channel level difference value corresponds to a value for a phase shift by +10° with 4 dB, a contribution extent of the inter-channel phase difference value and an extent of the inter-channel level difference value in the total sound image localization (20°+10°=30°) may amount to 20/30 and 10/30, respectively. In this case, as the inter-channel phase difference value can be regarded as having relatively greater significance, the information determining unit 1123 is able to determine to further use the inter-channel phase difference value.

If the information determining unit 1123 determines to further use the inter-channel phase difference value, the IPD flag generating unit 1124 is able to generate an inter-channel phase difference value flag indicating that the inter-channel phase difference value is used.

Meanwhile, the information obtaining unit 1130 can include an IPD flag obtaining unit 1131 and an IPD obtaining unit 1132. The IPD flag obtaining unit 1131 obtains the inter-channel phase difference value flag and then determines whether inter-channel phase difference value is included in spatial information. If the inter-channel phase difference value flag is set to 1, the IPD obtaining unit 1132 is activated and then obtains the inter-channel phase difference value from the spatial information. Subsequently, the upmixing unit 1140 decodes a plural channel signal by upmixing a downmix signal using the spatial information including the inter-channel phase difference value. Therefore, sound image localization can be performed more correctly than the case that the inter-channel phase difference value is not used. The inter-channel phase difference value is transferred only if a predetermined condition is met. Hence, it is able to raise coding efficiency as well.

Secondly, inter-channel phase difference value can be replaced by equivalent inter-channel level difference value, and vice versa. In this case, since the inter-channel phase difference value or the inter-channel level difference value necessary for the sound image localization may vary according to a frequency, a database defined per frequency band is referred to.

FIG. 12 shows a signal processing apparatus 1220 using equivalent inter-channel level difference value substituted for inter-channel phase difference value.

Referring to FIG. 12, a signal processing apparatus 1200 includes an ILD value measuring unit 1210, an IPD value measuring unit 1220, an information determining unit 1230, an IPD value converting unit 1240 and an ILD value modifying unit 1250.

The ILD value measuring unit 1210, the IPD value measuring unit 1220 and the information determining unit 1230 have the same configurations and functions of the former ILD value measuring unit 1110, the former IPD value measuring unit 1120 and the former information determining unit 1130, of which details are omitted in the following description. In case that the information determining unit 1130 determines to use inter-channel phase difference value, the measured inter-channel phase difference value is inputted to the IPD value converting unit 1240.

The IPD value converting unit 1240 converts the inter-channel phase difference value measured on a corresponding frequency band using the database to inter-channel level difference value ILD'. Subsequently, the ILD value modifying unit 1250 calculates a modified inter-channel level difference value ILD" by adding the inter-channel level difference value ILD' converted from the inter-channel phase difference value to inter-channel level difference value ILD inputted from the ILD value measuring unit 1210.

Thus, in case of converting the inter-channel phase difference value to the equivalent inter-channel level difference value to use, it is able to decode a signal, of which reverberation and sound image localization are enhanced by reflecting the inter-channel phase difference value, using the conventional signal processing apparatus and method, which do not accept the reception of the inter-channel phase difference value, in the HE AAC Plus of 3GPP or MPEG or PS in the USAC standard.

Thirdly, by applying inter-channel phase difference value to at least one or more consecutive frames in common, it is able to enhance correct sound image localization and coding efficiency. In the preset specification, the inter-channel phase difference value used for several consecutive frames is named global frame inter-channel phase difference value (global frame IPD value).

Figure 13:
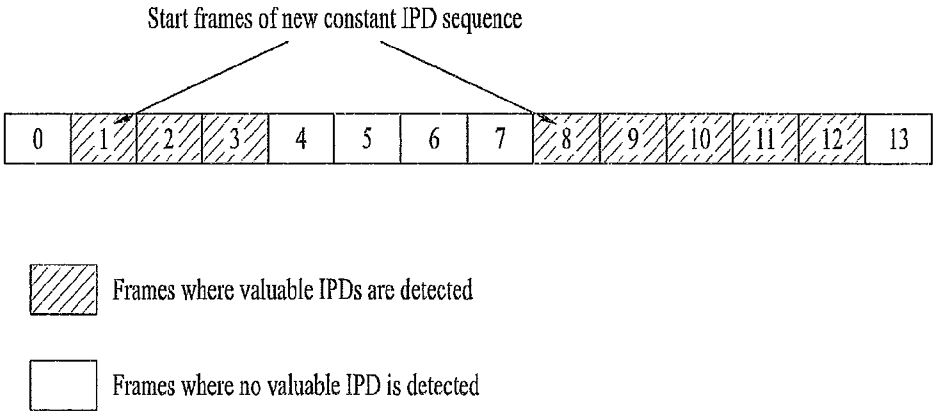
FIG. 13 is a diagram for a concept of using global frame inter-channel phase difference (IPD) value according to another embodiment of the present invention.

FIG. 13 is a diagram for a concept of using global frame inter-channel phase difference (IPD) value according to another embodiment of the present invention. In FIG. 13, numerals 0 to 13 indicate frames, respectively. A shaded frame indicates a frame that uses inter-channel phase difference value. A non-shaded frame indicates a frame that does not use inter-channel phase difference value. They can be determined based on an inter-channel phase difference mode flag (bsPhaseMode) described in this disclosure.

Referring to FIG. 13, in case that the frame 1 to 3 and the frame 8 to 12 use the inter-channel phase difference value only, a representative value is calculated without transferring the inter-channel phase difference value for each frame and is then equally applied to consecutive frames determined to have the inter-channel phase difference value applied thereto. Global frame inter-channel phase difference value is included in a first one of the consecutive frames. And, each frame is able to include a global frame inter-channel phase difference flag indicating whether the global frame inter-channel phase difference value is used. The meaning of the global frame inter-channel phase difference flag is shown in Table 4.

TABLE 4

| Global_frame_IPD_flag | Meaning |
|---|---|
| 1 | Global frame inter-channel phase difference value is used. |
| 0 | Global frame inter-channel phase difference value is not used. |

For instance, a frame 0 does not use the global frame inter-channel phase difference value based on the global frame inter-channel phase difference flag but the frame 1 uses the global frame inter-channel phase difference value. Hence, the frame 1 includes the global frame inter-channel phase difference value and the same global frame inter-channel phase difference value is applicable to the frames 1 to 3. Likewise, the frame 8 includes the global frame inter-channel phase difference value and the same global frame inter-channel phase difference value is applicable to the frames 8 to 12

Figure 14:
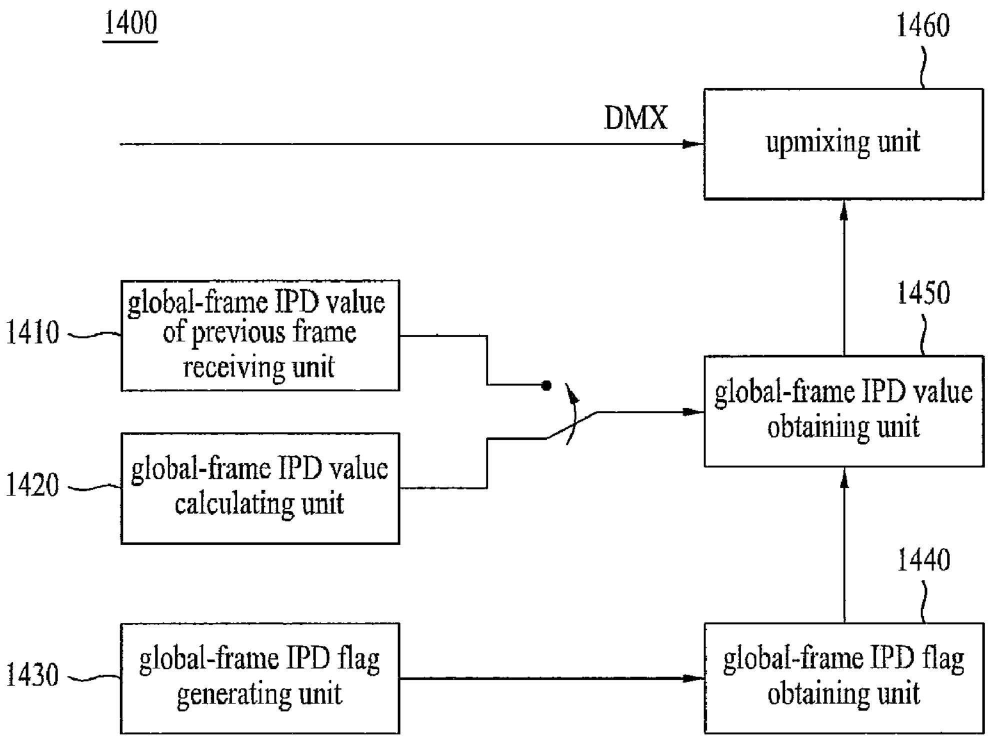
FIG. 14 is a block diagram of a signal processing apparatus according to another embodiment of the present invention.

FIG. 14 is a block diagram of a signal coding apparatus 1400 using global frame inter-channel phase difference value according to an embodiment of the present invention.

Referring to FIG. 14, a signal coding apparatus 1400 includes global frame IPD value of previous frame receiving unit 1410, a global frame IPD value calculating unit 1420, a global frame IPD flag generating unit 1430, a global frame IPD flag obtaining unit 1440, a global frame IPD value obtaining unit 1450 and an upmixing unit 1460.

The global frame IPD value of previous frame receiving unit 1410 receives global frame inter-channel phase difference value of a previous frame. For instance, if a current frame is a first frame including global frame inter-channel phase difference value, global frame inter-channel phase difference value of a received previous frame will not exist. On the contrary, if a current frame is a second or higher-order frame among consecutive frames including the global frame inter-channel phase difference value, it is able to receive the global frame inter-channel phase difference value from a previous frame.

The global frame ILD value calculating unit 1420 is able to calculate the global frame inter-channel phase difference value if a current frame is a first frame including the global frame inter-channel phase difference value, i.e., if the global frame inter-channel phase difference value of a previous frame does not exist. The global frame inter-channel phase difference value of a current frame may include an average of inter-channel phase difference values of the consecutive frames for which the inter-channel phase difference value is used.

The global frame IPD flag generating unit 1430 generates global frame IPD flag (global_frame_IPD_flag) indicating whether the global frame IPD value is used in a current frame.

Subsequently, the global frame IPD flag obtaining unit 1440 obtains the global frame inter-channel phase difference value. And, the global frame IPD value obtaining unit 1450 is able to obtain the global frame inter-channel phase difference value of a previous frame outputted from the previous frame global frame IPD value receiving unit 1410 or the global frame inter-channel phase difference value of the current frame outputted from the global frame IPD value calculating unit 1420. Preferably, if a current frame is a first one of consecutive frames having the inter-channel phase difference value applied thereto, the global frame IPD value obtaining unit 1450 obtains the global frame inter-channel phase difference value of a previous frame. If a current frame is a second or higher-order frame, the global frame IPD value obtaining unit 1450 is able to obtain the calculated global frame inter-channel phase difference value of the current frame.

And, the upmixing unit 1460 generates a plural channel signal by applying the global frame inter-channel phase difference value to a downmix signal.

Fourthly, in order to adjust a decoded plural channel signal to have reverberation maximally close to that of a plural channel signal inputted to an encoder, it is able to adjust inter-channel correlation value. Referring now to FIG. 10B, in case of decoding a signal using inter-channel phase difference value and inter-channel correlation value, the problem of exaggerating reverberation more than that of an original signal is caused. This reverberation means an effect as if a signal exists in a wider or narrower space due to ambience. In this disclosure, the exaggeration of the reverberation means that a decoded signal is heard as if recorded in a wide hall despite that an original signal is recorded in a narrow recording room.

This problem is frequently caused in a conventional signal processing method and apparatus, in which inter-channel phase difference value is not transferred. Yet, this problem may be caused in case of transferring the inter-channel phase difference value.

Figure 15:
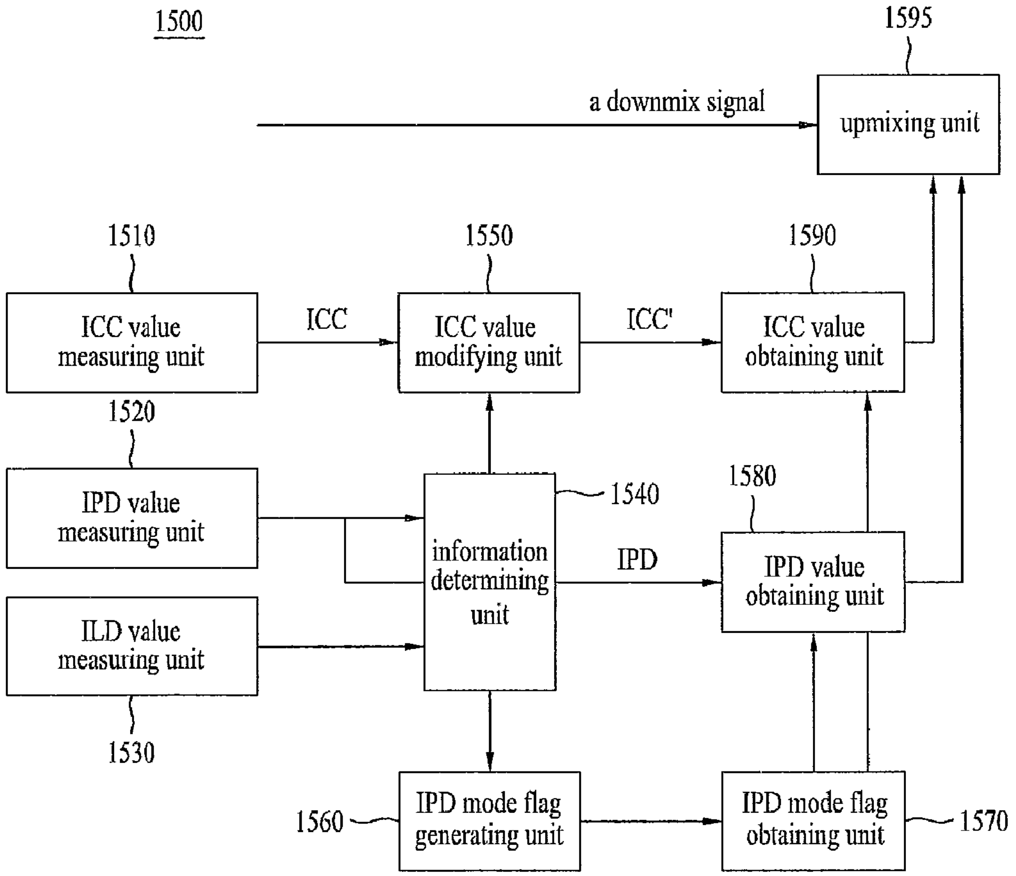
FIGS. 15 to 17 are block diagrams of a signal processing apparatus according to another embodiment of the present invention.

This problem can be solved in a manner shown in FIG. 15. FIG. 15 is a block diagram of a signal processing apparatus 1500 according to another embodiment of the present invention.

Referring to FIG. 15, a signal processing apparatus 1500 includes an ICC value measuring unit 1510, an IPD value measuring unit 1520, an ILD value measuring unit 1530, an information determining unit 1540, an ICC value modifying unit 1550, an IPD mode flag generating unit 1560, an IPD mode flag obtaining unit 1570, an IPD value obtaining unit 1580, an ICC value obtaining unit 1590 and an upmixing unit 1595.

The ICC value measuring unit 1510, the IPD value measuring unit 1520 and the ILD value measuring unit 1530 can measure inter-channel correlation value, inter-channel phase difference value and inter-channel level difference value from a plural channel signal, respectively.

The information determining unit 1540 and the IPD mode flag generating unit 1560 have the same configurations and functions of the former information determining unit and the former IPD flag generating unit 1124 in FIG. 11, respectively. The information determining unit 1540 calculates a ratio of the measure inter-channel level/phase difference information to total sound image localization. The information determining unit 1540 then determines to use the inter-channel phase difference value only if the ratio of the inter-channel phase difference value is higher than the other. The IPD mode flag generating unit 1560 generate an inter-channel phase difference mode flag indicating whether the inter-channel phase difference value is used.

If the information determining unit 1540 determines to use the inter-channel phase difference value, the ICC value modifying unit 1550 is able to modify the inter-channel correlation value inputted from the ICC measuring unit 1510. Preferably, the measured inter-channel correlation value may not be included in a parameter band that uses the inter-channel phase difference value. In order to solve the problem of the reverberation exaggeration, a size of a value indicated by the inter-channel correlation value can be modified to use.

The IPD flag obtaining unit 1570 and the IPD value obtaining unit 1580 have the same configurations and functions of the former IPD flag obtaining unit 1131 and the former IPD value obtaining unit 1132 in FIG. 11, of which details are omitted in the following description.

If the inter-channel phase difference flag of the IPD flag obtaining unit 1570 indicates that the inter-channel phase difference value is used, the ICC value obtaining unit 1590 receives the modified inter-channel correlation value from the ICC value modifying unit 1550.

And, the upmixing unit 1595 is able to generate a plural channel signal by applying the inter-channel phase difference value and the modified inter-channel correlation value to the received downmix signal. Therefore, it is able to prevent a signal from being distorted by the reverberation exaggerated by the inter-channel correlation value in the signal processing method and apparatus using the inter-channel phase difference value.

Fifthly, the inter-channel phase difference value is able to use the feature that significance of a signal having a simpler sound source increases higher.

Figure 16:
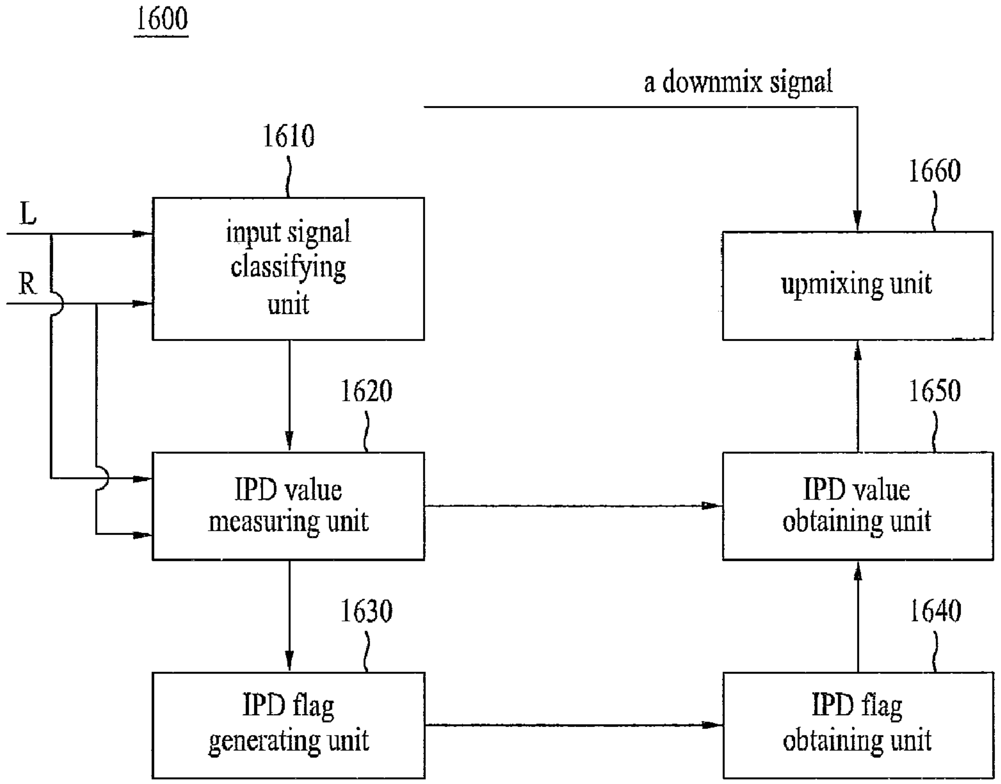

FIG. 16 is a block diagram of a signal processing apparatus 1600 according to another embodiment of the present invention.

Referring to FIG. 16, a signal processing apparatus 1600 includes an input signal classifying unit 1610, an IPD value measuring unit 1620, an IPD flag generating unit 1630, an IPD flag obtaining unit 1640, an IPD value obtaining unit 1650 and an upmixing unit 1660.

The input signal classifying unit 1610 determines whether an input signal is a pure speech signal containing speech only, a music signal or a mixed signal having speech and music signals mixed with each other. Preferably, the input signal classifying unit 1610 can include one of a sound activity detector (SAD), a speech and music classifier (SMC) and the like.

The IPD value measuring unit 1620 measures inter-channel phase difference value only if the input signal is determined as the signal containing the speech signal only (pure speech signal) by the input signal classifying unit 1610.

The IPD flag generating unit 1630, the IPD flag obtaining unit 1640, the IPD value obtaining unit 1650 and the upmixing unit 1660 have the same configurations and functions of the former IPD flag generating unit 1124, the former IPD flag obtaining unit 1131, the former IPD value obtaining unit 1132 and the former upmixing unit 1140 in FIG. 11, respectively, of which details are omitted in the following description.

A music signal containing various signal therein or a mixed signal having speech and music signals mixed therein enables sound image localization to a prescribed extent using inter-channel level difference value and inter-channel correlation value despite not using inter-channel phase difference value. Yet, since such a simple sound source as a speech signal has relatively high significance of inter-channel phase difference value significance, correct sound image localization is impossible without inter-channel phase difference value. Therefore, if an input signal is a speech signal according to the input signal classifying unit 1610, inter-channel phase difference value is used, whereby a plural channel signal can be decoded with core correct sound image localization.

Figure 17:
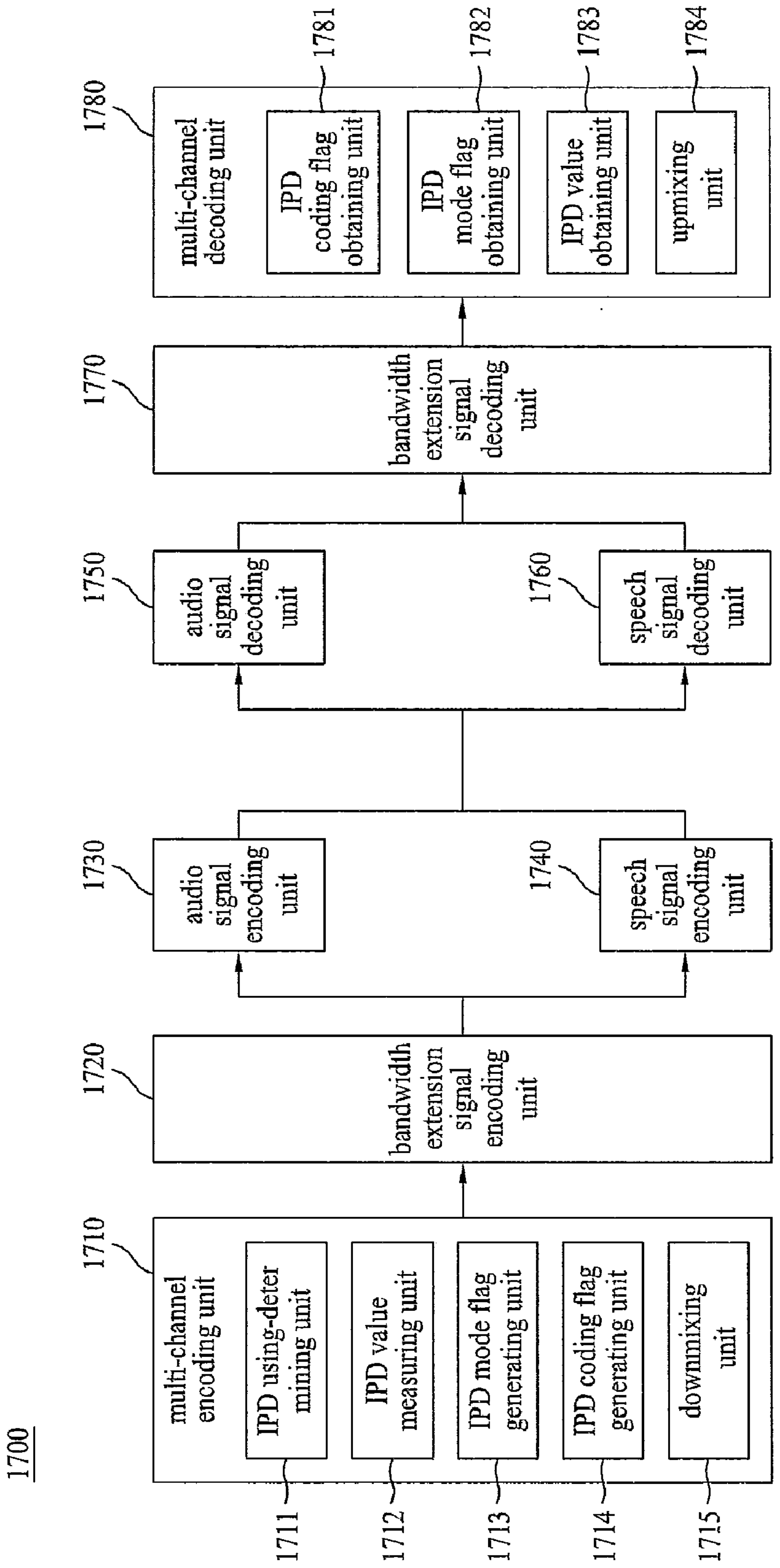

FIG. 17 shows a signal processing apparatus 1700 according to another embodiment of the present invention.

Referring to FIG. 17, a signal processing apparatus 1700 includes a plural channel encoding unit 1710, a bandwidth extension signal encoding unit 1720, an audio signal encoding unit 1730, a speech signal encoding unit 1740, an audio signal decoding unit 1750, a speech signal decoding unit 1760, a bandwidth extension signal decoding unit 1770 and a plural channel decoding unit 1780.

First of all, a downmix signal, which is generated by the plural channel encoding unit 1710 from downmixing a plural channel signal, is named a whole band downmix signal. And, a downmix signal, which has a low frequency band only as a high frequency band signal is removed from the whole band downmix signal, is named a low frequency band downmix signal.

The plural channel encoding unit 1710 receives an input of a plural channel signal having plural channels. The plural channel encoding unit 1710 generates a whole band downmix signal by downmixing the inputted plural channel signal and also generates spatial information corresponding to the plural channel signal. In this case, the spatial information can contain channel level difference information, channel prediction coefficient, inter-channel correlation value, downmix gain information, etc.

The plural channel encoding unit 1710 according to one embodiment of the present invention determines whether to use inter-channel phase difference value and then measures the inter-channel phase difference value. The plural channel encoding unit 1710 generates inter-channel phase difference mode information indicating whether a frame uses the inter-channel phase difference value and also generates inter-channel phase difference coding information indicating whether a frame using the inter-channel phase difference value exists among whole frames. The plural channel encoding unit 1710 is then able to transfer the generated informations together with mix information. This is as good as described with reference to FIGS. 1 to 4 and its details are omitted in the following description.

Hence, the plural channel encoding unit 1710 can include the encoding device of the signal processing apparatus described with reference to FIGS. 1 to 4 or the signal processing apparatus according to another embodiment of the present invention described with reference to FIGS. 5 to 16.

The bandwidth extension signal encoding unit 1720 receives the whole band downmix signal and is then able to generate extension information corresponding to a high frequency band signal in the whole band downmix signal. In this case, the extension information is the information for enabling a decoder side to reconstruct a low frequency band downmix signal resulting from removing a high frequency band into the whole band downmix signal. And, the extension information can be transferred together with the spatial information.

It is determined whether a downmix signal will be coded by an audio signal coding scheme or a speech signal coding scheme based on a signal characteristic. And, mode information for determining the coding scheme is generated [not shown in the drawing]. In this case, the audio coding scheme may use MDCT (modified discrete cosine transform), by which the present invention is non-limited. And, the speech coding scheme may follow the AMR-WB (adaptive multi-rate wideband) standard, by which the present invention is non-limited.

The audio signal encoding unit 1730 encodes the low frequency band downmix signal, from which the high frequency region is removed, according to the audio signal coding scheme using the extension information and the whole band downmix signal inputted from the bandwidth extension signal encoding unit 1720.

A signal coded by the audio signal coding scheme can include an audio signal or a signal having a speech signal partially included in an audio signal. And, the audio signal encoding unit 1730 may include a frequency-domain encoding unit.

The speech signal encoding unit 1740 encodes a low-frequency band downmix signal, from which a high frequency region is removed, according to a speech signal coding scheme using the extension information and the whole band downmix signal inputted from the bandwidth extension signal encoding unit 1720.

The signal encoded by the speech signal coding scheme can include a speech signal or an audio signal partially contained in a speech signal. The speech signal encoding unit 1740 is able to further use linear prediction coding (LPC) scheme. If an input signal has high redundancy on a time axis, modeling can be performed by linear prediction for predicting a current signal from a past signal. In this case, if the linear prediction coding scheme is adopted, coding efficiency can be raised. Meanwhile, the speech signal encoding unit 1740 can include a time-domain encoding unit.

The audio signal decoding unit 1750 decodes a signal according to an audio signal coding scheme. The signal inputted to and decoded by the audio signal decoding unit 1750 can include an audio signal or a signal having a speech signal partially included in an audio signal. And, the audio signal decoding unit 1750 can include a frequency-domain decoding unit and is able to use IMDCT (inverse modified discrete coefficient transform).

The speech signal decoding unit 1760 decodes a signal according to a speech signal coding scheme. The signal decoded by the speech signal decoding unit 1760 can include a speech signal or a signal having an audio signal partially included in a speech signal. The speech signal decoding unit 1760 can include a time-domain decoding unit and is able to further use linear prediction coding (LPC) scheme.

The bandwidth extension decoding unit 1770 receives the low-frequency band downmix signal, which is the signal decoded by the audio signal decoding unit 1750 or the speech signal decoding unit 1760, and the extension information and then generates a whole band downmix signal of which signal corresponding to the high-frequency region having been removed in encoding is reconstructed.

It is able to generate the whole band downmix signal using the whole low-frequency band downmix signal and the extension information or using the low-frequency band downmix signal in part.

The plural channel decoding unit 1780 receives the whole band downmix signal, the spatial information, the inter-channel phase difference value, the inter-channel phase difference mode flag and the inter-channel phase difference coding flag and then generates a downmix signal by applying theses informations to the whole band downmix signal. Details of this process are described in detail with reference to FIGS. 1 to 4 and are omitted in the following description.

Thus, in a signal processing method and apparatus according to the present invention, a plural channel signal is generated using inter-channel phase difference value, whereby a phase or delay difference difficult to be reproduced by a related art plural channel decoder can be effectively reproduced.

Figure 18:
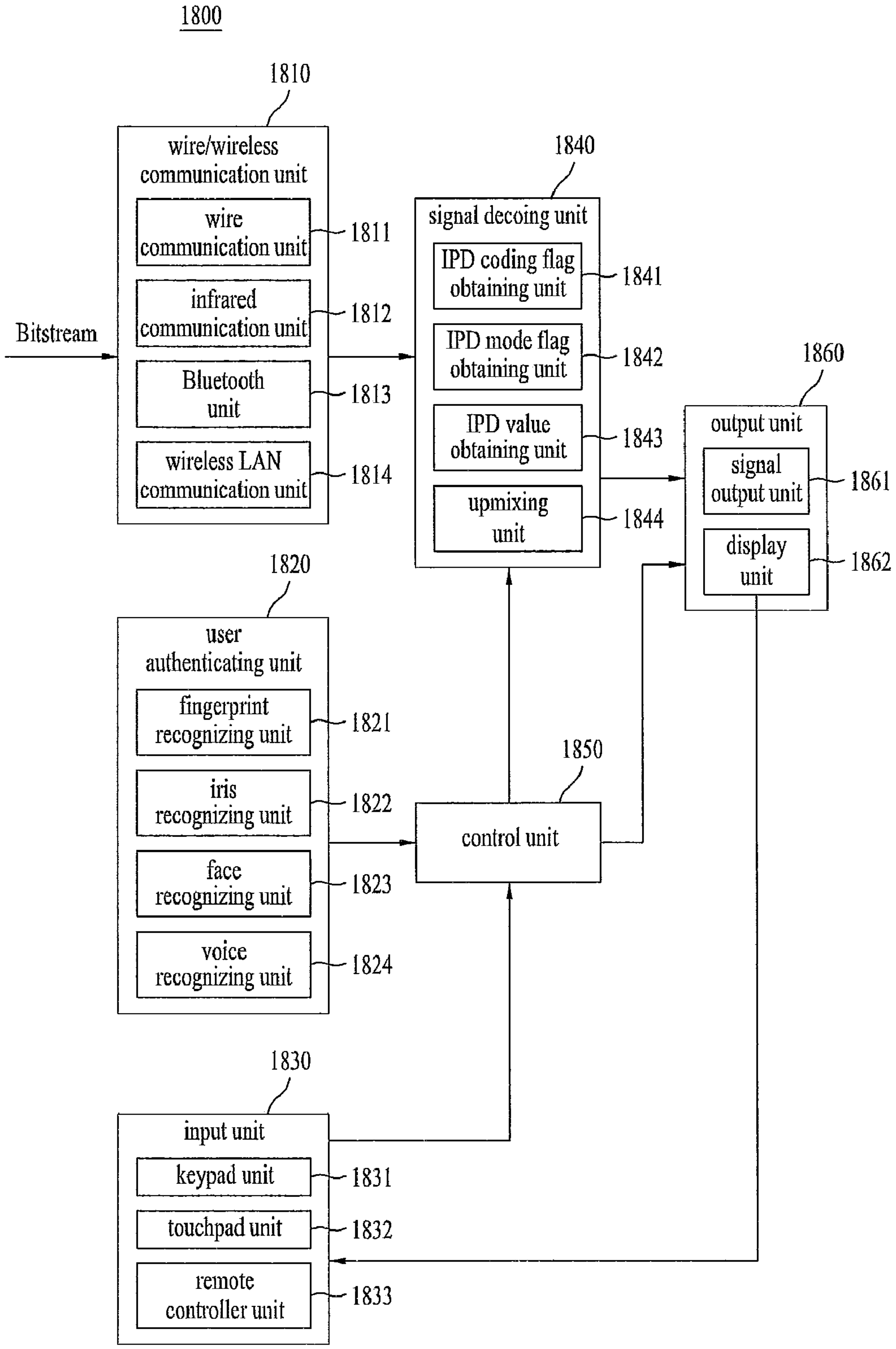
FIG. 18 is a schematic diagram of a configuration of a product including an IPD coding flag obtaining unit, an IPD mode flag obtaining unit, an IPD obtaining unit and an upmixing unit according to another embodiment of the present invention.

FIG. 18 is a schematic diagram of a configuration of a product including an IPD coding flag obtaining unit 1841, an IPD mode flag obtaining unit 1842, an IPD value obtaining unit 1843 and an upmixing unit 1844 according to another embodiment of the present invention. And, FIG. 19A and FIG. 19B are schematic diagrams for relations of products including an IPD coding flag obtaining unit 1841, an IPD mode flag obtaining unit 1842, an IPD value obtaining unit 1843 and an upmixing unit 1844 according to another embodiment of the present invention, respectively.

Referring to FIG. 18, a wire/wireless communication unit 1810 receives a bitstream by wire/wireless communications. In particular, the wire/wireless communication unit 1810 includes at least one of a wire communication unit 1811, an infrared communication unit 1812, a Bluetooth unit 1813 and a wireless LAN communication unit 1814.

A user authenticating unit 1820 receives an input of user information and then performs user authentication. The user authenticating unit 1820 can include at least one of a fingerprint recognizing unit 1821, an iris recognizing unit 1822, a face recognizing unit 1823 and a voice recognizing unit 1824. In this case, the user authentication can be performed in a manner of receiving an input of fingerprint information, iris information, face contour information or voice information, converting the inputted information to user information, and then determining whether the user information matches registered user data.

An input unit 1830 is an input device for enabling a user to input various kinds of commands. And, the input unit 1830 can include at least one of a keypad unit 1831, a touchpad unit 1832 and a remote controller unit 1833, by which examples of the input unit 1830 are non-limited.

A signal decoding unit 1840 includes an IPD coding flag obtaining unit 1841, an IPD mode flag obtaining unit 1842, an IPD value obtaining unit 1843 and an upmixing unit 1844, which have the same configurations and functions of the former units of the same names in FIG. 2, respectively. And, details of the signal decoding unit 1840 are omitted in the following description.

A control unit 1850 receives input signals from the input devices and controls all processes of the signal decoding unit 1840 and an output unit 1860. As mentioned in the foregoing description, if such a user input as 'on/off' of a phase shift of an output signal, an input/output of metadata, on/off operation of a signal decoding unit and the like is inputted to the control unit 1850 from the input unit 1830, the control unit 1850 decodes a signal using the user input.

And, the output unit 1860 is an element for outputting an output signal and the like generated by the signal decoding unit 1840. The output unit 1860 can include a signal output unit 1861 and a display unit 1862. If an output signal is an audio signal, it is outputted via the signal output unit 1861. If an output signal is a video signal, it is outputted via the display unit 1862. Moreover, if metadata is inputted to the input unit 1830, it is displayed on a screen via the display unit 1862.

Figure 19:
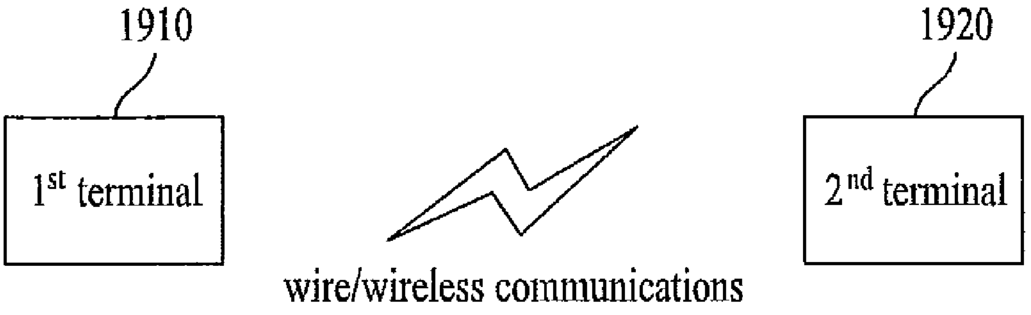
FIG. 19 is schematic diagrams for relations of products including an IPD coding flag obtaining unit, an IPD mode flag obtaining unit, an IPD obtaining unit and an upmixing unit according to another embodiment of the present invention, respectively.
Figure 19:
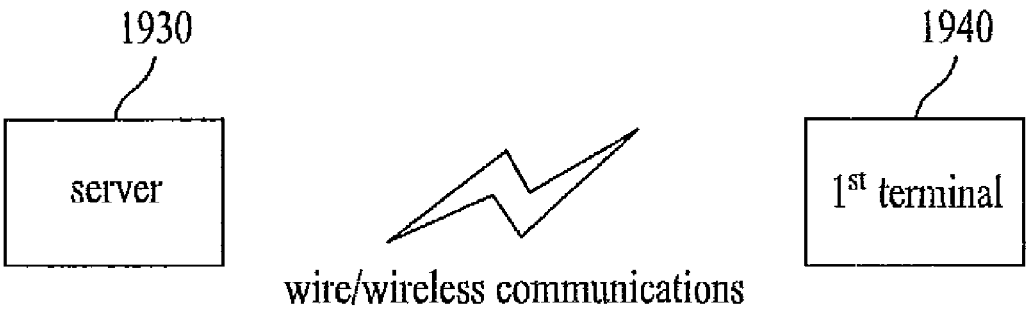

FIG. 19 shows relation between terminals or between terminal and server, which correspond to the product shown in FIG. 18.

Referring to FIG. 19A, it can be observed that bidirectional communications of data or bitstream can be performed between a first terminal 1910 and a second terminal 1920 via wire/wireless communication limits. In this case, the data or bitstream exchanged via the wire/wireless communication unit may have the structure of the former bitstream of the present invention shown in FIG. 1 or may include the former data including the phase shift flag, the global frame inter-channel phase shift flag and the like of the present invention described with reference to FIGS. 5 to 16. Referring to FIG. 19B, it can be observed that wire/wireless communications can be performed between a server 1930 and a first terminal 1940.

Figure 20:
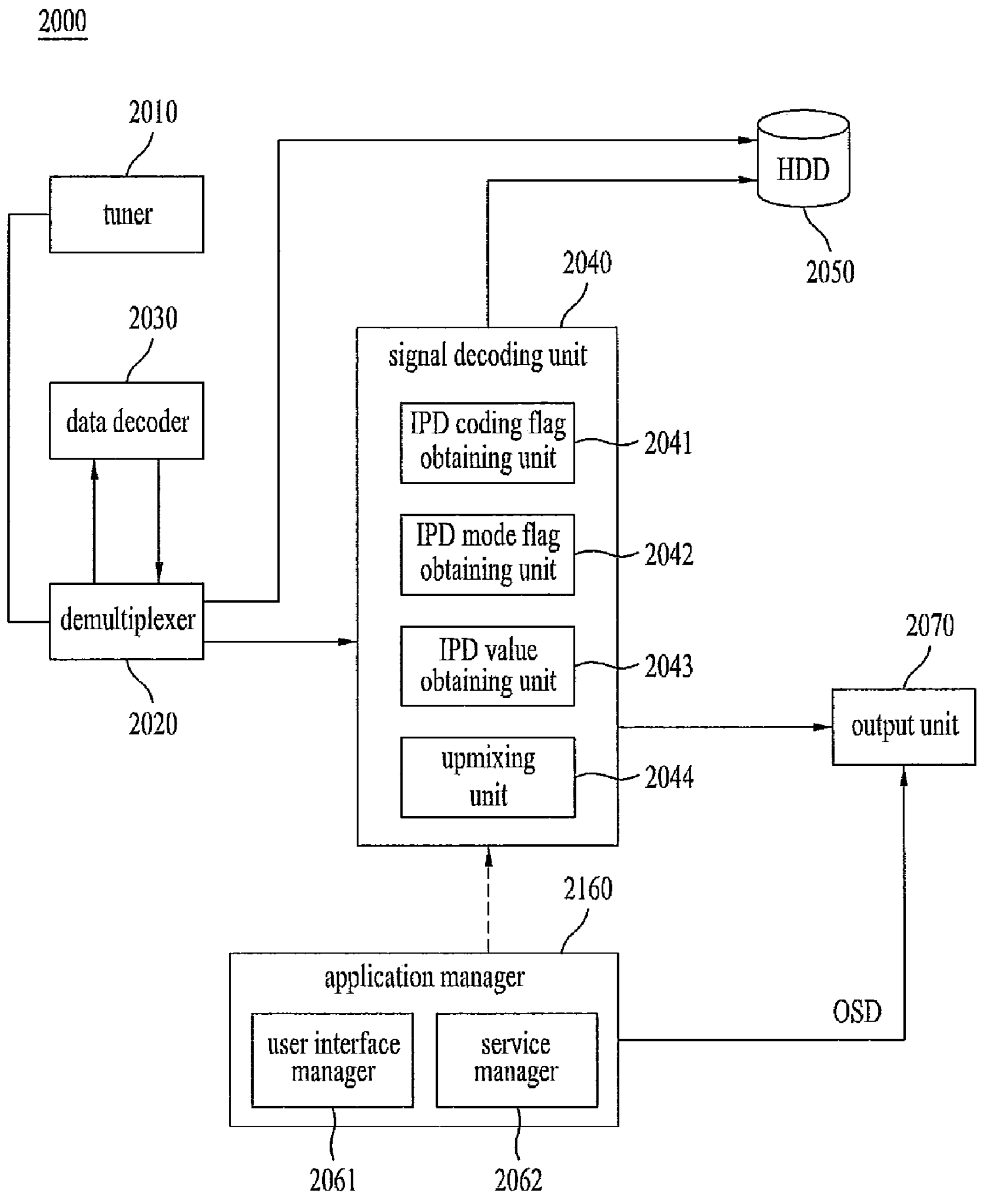
FIG. 20 is a schematic block diagram of a broadcast signal decoding apparatus including an IPD coding flag obtaining unit, an IPD mode flag obtaining unit, an IPD obtaining unit and an upmixing unit according to another embodiment of the present invention.

FIG. 20 is a schematic block diagram of a broadcast signal decoding apparatus including an IPD coding flag obtaining unit 2041, an IPD mode flag obtaining unit 2042, an IPD value obtaining unit 2043 and an upmixing unit 2044 according to another embodiment of the present invention.

Referring to FIG. 20, a demultiplexer 2020 receives a plurality of data related to a TV broadcast from a tuner 2010. The received data are separated by the demultiplexer 2020 and are then decoded by a data decoder 2030. Meanwhile, the data separated by the demultiplexer 2020 can be stored in such a storage medium 2050 as an HDD.

The data separated by the demultiplexer 2020 are inputted to a signal decoding unit 2040 including a plural channel decoding unit 2041 and a video decoding unit 2042 to be decoded into an audio signal and a video signal. The signal decoding unit 2040 includes an IPD coding flag obtaining unit 2041, an IPD mode flag obtaining unit 2042, an IPD obtaining unit 2043 and an upmixing unit 2044 according to one embodiment of the present invention. They have the same configurations and functions of the former units of the same names shown in FIG. 2 and their details are omitted in the following description. The signal decoding unit 2040 decodes a signal using the received inter-channel phase difference value and the like. If a video signal is inputted, the signal decoding unit 2040 decodes and outputs the video signal. If metadata is generated, the signal decoding unit 2040 outputs the metadata in a text type.

If the video signal is decoded, and an outputted video signal and metadata are generated, an output unit 2070 displays the outputted metadata. The output unit 2070 includes a speaker unit (not shown in the drawing) and outputs a plural channel signal, which is decoded using the inter-channel phase difference value, via the speaker unit included in the output unit 2070. Moreover, the data decoded by the signal decoding unit 2040 can be stored in a storage medium 2050 such as an HDD.

Meanwhile, the signal decoding apparatus 2000 can further include an application manager 2060 capable of controlling a plurality of data received according to an input of information from a user. The application manager 2060 includes a user interface manager 2061 and a service manager 2062. The user interface manager 2061 controls an interface for receiving an input of information from a user. For instance, the user interface manager 2061 is able to control a font type of text displayed on the output unit 2070, a screen brightness, a menu configuration and the like. Meanwhile, if a broadcast signal is decoded and outputted by the signal decoding unit 2040 and the output unit 2070, the service manager 2062 is able to control a received broadcast signal using information inputted by a user. For instance, the service manager 2062 is able to provide a broadcast channel setting, an alarm function setting, an adult authentication function, etc. The data outputted from the application manager 2060 are usable by being transferred to the output unit 2070 as well as the signal decoding unit 2040.

Accordingly, as a signal processing apparatus of the present invention is included in a real product, the present invention improves a sound quality is improved better than that of the related art for the plural channel signal upmixed using the inter-channel level difference value and the inter-channel correlation value only. Moreover, the present invention enables a user to listen to a plural channel signal closer to an original input signal.

The present invention applied decoding/encoding method can be implemented in a program recorded medium as computer-readable codes. And, multimedia data having the data structure of the present invention can be stored in the computer-readable recoding medium. The computer-readable recording media include all kinds of storage devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, a bitstream generated by the encoding method is stored in a computer-readable recording medium or can be transmitted via wire/wireless communication network.

INDUSTRIAL APPLICABILITY

Accordingly, the present invention is applicable to signal encoding/decoding.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of processing a signal, comprising:

receiving (a) a downmix signal being generated from a plural-channel signal and (b) spatial information indicating attributes of the plural-channel signal in order to upmix the downmix signal and including a phase shift flag indicating whether a phase of a frame of at least one channel of the plural-channel signal is shifted;

obtaining an inter-channel phase difference (IPD) coding flag indicating whether an IPD value is used in the spatial information from a header of the spatial information;

obtaining an IPD mode flag indicating whether the IPD value is used in a frame of the spatial information from the frame based on the IPD coding flag;

obtaining the IPD value corresponding to a parameter band in the frame, based on the IPD mode flag;

upmixing the plural-channel signal by applying the IPD value to the downmix signal; and shifting the phase of the frame of the at least one channel of the plural-channel signal based on the phase shift flag, wherein the spatial information includes the header, the frame, and at least one other additional frame, wherein the IPD value indicates a phase difference between two channels of the plural-channel signal, and wherein the parameter band is at least one sub-band of a frequency domain including the IPD value.

2. The method of claim 1, wherein the phase-shifted plural-channel signal is shifted the phase of the frame of the at least one channel by Π/2.

3. The method of claim 1, wherein the phase-shifted plural-channel signal is shifted the phase of the frame of the at least one channel by a same phase for a whole frequency band.

4. The method of claim 1, wherein the phase shift flag is variable per frame.

5. The method of claim 1, wherein the phase shift flag is variable per sub-band.

6. An apparatus of processing a signal, comprising:

a signal receiving unit receiving (a) a downmix signal being generated from a plural-channel signal and (b) spatial information indicating attributes of the plural-channel signal in order to upmix the downmix signal and including a phase shift flag, the phase shift flag indicating whether a phase of at least one channel of the plural-channel signal is shifted;

an inter-channel phase difference (IPD) coding flag obtaining unit obtaining an IPD coding flag indicating whether an IPD value is used in the spatial information;

an IPD mode flag obtaining unit obtaining an IPD mode flag indicating whether an IPD value is used in a frame of the spatial information, based on the IPD coding flag;

an IPD obtaining unit obtaining the IPD value corresponding to a parameter band in the frame, based on the IPD mode flag;

an upmixing unit upmixing the plural-channel signal by applying the IPD value to the downmix signal; and a signal-phase shift unit shifting the phase of the frame of at least one channel of the plural-channel signal based on the phase shift flag, wherein the spatial information includes a header and a plurality of the frames, wherein the IPD value indicates a phase difference between two channels of the plural-channel signal, and wherein the parameter band is at least one sub-band of a frequency domain including the IPD value.

7. The apparatus of claim 6, wherein the signal-phase shift unit shifts the phase of the at least one channel by ø/2.

8. The apparatus of claim 6, wherein the signal-phase shift unit shifts the phase of the frame of the at least one channel by a same phase for a whole frequency band.

9. The apparatus of claim 6, wherein the phase shift flag is variable per frame.

10. The apparatus of claim 6, wherein the phase shift flag is variable per sub-band.

11. A method of processing a signal, comprising:

generating a plural-channel signal by shifting a phase of an input signal and a phase shift flag indicating whether a phase of a frame of at least one channel of the plural-channel signal is shifted;

generating a downmix signal by downmixing the plural-channel signal; and generating spatial information indicating attributes of the plural-channel signal in order to upmix the downmix signal, wherein the generating spatial information comprises:

measuring an inter-channel phase difference (IPD) value indicating a phase difference between two channels of the plural-channel signal;

generating an IPD mode flag indicating whether the IPD value is used in a frame of the spatial information;

generating an IPD coding flag indicating whether the IPD value is used in the spatial information; and including the phase shift flag, the IPD value and the IPD mode flag in the frame of the spatial information and including the IPD coding flag in a header of the spatial information.

12. An apparatus of processing a signal, comprising:

a signal modifying unit determining a phase shift flag in order to modify a phase of a frame of at least one channel of input signal;

a signal modifying unit generating a plural-channel signal by shifting the phase of the input signal and the phase shift flag indicating whether the phase of the frame of at least one channel of the plural-channel signal is shifted;

a downmixing unit generating a downmix signal by downmixing the plural-channel signal; and a spatial information generating unit generating spatial information indicating attributes of the plural-channel signal in order to upmix the downmix signal;

wherein the spatial information generating unit comprises:

an inter-channel phase difference (IPD) measuring unit measuring an IPD value indicating a phase difference between two channels of the plural-channel signal;

an IPD mode flag generating unit generating an IPD mode flag indicating whether the IPD value is used in a frame of the spatial information; and an IPD coding flag generating unit generating an IPD coding flag indicating whether the IPD value is used in the spatial information, and wherein the phase shift flag, the IPD value and the IPD mode flag are included in the frame of the spatial information, and the IPD coding flag is included in a header of the spatial information.

* * * * *